United States Patent
Yasuda et al.

(10) Patent No.: US 12,300,826 B2
(45) Date of Patent: May 13, 2025

(54) POWER STORAGE DEVICE PACKAGING MATERIAL, METHOD FOR PRODUCING THE SAME, AND POWER STORAGE DEVICE

(71) Applicant: DAI NIPPON PRINTING CO., LTD., Tokyo (JP)

(72) Inventors: Daisuke Yasuda, Tokyo (JP); Takanori Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 626 days.

(21) Appl. No.: 17/627,481

(22) PCT Filed: Jul. 17, 2020

(86) PCT No.: PCT/JP2020/027784
§ 371 (c)(1),
(2) Date: Jan. 14, 2022

(87) PCT Pub. No.: WO2021/010457
PCT Pub. Date: Jan. 21, 2021

(65) Prior Publication Data
US 2022/0278397 A1    Sep. 1, 2022

(30) Foreign Application Priority Data
Jul. 17, 2019  (JP) ................. 2019-131896

(51) Int. Cl.
*H01M 50/121*  (2021.01)
*H01M 50/129*  (2021.01)
(Continued)

(52) U.S. Cl.
CPC ....... *H01M 50/129* (2021.01); *H01M 50/121* (2021.01); *H01M 50/133* (2021.01); *H01G 9/08* (2013.01)

(58) Field of Classification Search
None
See application file for complete search history.

(56) References Cited

U.S. PATENT DOCUMENTS

2008/0286635 A1  11/2008  Seino et al.
2013/0143107 A1   6/2013  Kuramoto
(Continued)

FOREIGN PATENT DOCUMENTS

EP    3778818 A1      2/2021
JP    2008-287971 A  11/2008
(Continued)

OTHER PUBLICATIONS

Sep. 24, 2020 International Search Report issued in International Patent Application No. PCT/JP2020/027784.
(Continued)

*Primary Examiner* — Maria Laios
*Assistant Examiner* — Jordan E Berresford
(74) *Attorney, Agent, or Firm* — Oliff PLC

(57) ABSTRACT

A power storage device packaging material including a heat-sealable resin layer containing polypropylene and polyethylene, in which whitening and a decrease in the insulation properties due to molding are prevented. A laminate with at least a base material layer, a barrier layer, and a heat-sealable resin layer in this order from an outer side toward an inner side, wherein the heat-sealable resin layer contains polypropylene and polyethylene; a cross section of the heat-sealable resin layer in a thickness direction parallel to TD, a sea-island structure is observed in a cross-sectional image obtained with scanning electron microscope; the cross-sectional image is such that when the total thickness of a layer positioned closer to inner side than the barrier layer is taken as 100%, the cross-sectional image is obtained within a range of thicknesses of up to 12.5% from a surface
(Continued)

opposite to the barrier layer side of the heat-sealable resin layer.

30 Claims, 2 Drawing Sheets

(51) Int. Cl.
  *H01M 50/133* (2021.01)
  *H01G 9/08* (2006.01)

(56) References Cited

U.S. PATENT DOCUMENTS

| | | | |
|---|---|---|---|
| 2013/0209868 A1 | 8/2013 | Suzuta et al. | |
| 2014/0072864 A1* | 3/2014 | Suzuta | B32B 15/20 29/623.2 |
| 2016/0172638 A1* | 6/2016 | Amano | H01M 50/119 429/185 |
| 2018/0102514 A1 | 4/2018 | Dai et al. | |

FOREIGN PATENT DOCUMENTS

| | | |
|---|---|---|
| JP | 2013-101778 A | 5/2013 |
| JP | 2016-122569 A | 7/2016 |
| JP | 2017-004765 A | 1/2017 |
| JP | 2017-193699 A | 10/2017 |
| JP | 2018-060753 A | 4/2018 |
| JP | 2019-061938 A | 4/2019 |
| WO | 2012/050182 A1 | 4/2012 |
| WO | 2019/188284 A1 | 10/2019 |

OTHER PUBLICATIONS

Jul. 30, 2024 Office Action issued in Japanese Patent Application No. 2021-006434.

Mitsui Chemicals Group, "TAFMER TM Product Introduction," Aug. 24, 2018, https://www.chem-t.com/fax/images/tmp_files4_1535093776.pdf.

* cited by examiner

POWER STORAGE DEVICE PACKAGING MATERIAL, METHOD FOR PRODUCING THE SAME, AND POWER STORAGE DEVICE

TECHNICAL FIELD

The present disclosure relates to a power storage device packaging material, a method for producing the power storage device packaging material, and a power storage device.

BACKGROUND ART

Various types of power storage devices have heretofore been developed. In every power storage device, a packaging material is an essential member for sealing a power storage device element including electrodes, an electrolyte, and the like. Metallic packaging materials have heretofore been widely used as power storage device packaging materials.

In recent years, along with the improved performance of electric cars, hybrid electric cars, personal computers, cameras, mobile phones, and the like, power storage devices have been required to have a variety of shapes, and also required to be reduced in thickness and weight. However, metallic power storage device packaging materials that have heretofore been widely used are disadvantageous in that they are difficult to conform to diversified shapes, and are limited in terms of weight reduction.

Thus, a film-shaped laminate in which a base material layer/a barrier layer/a heat-sealable resin layer are laminated in this order has been recently proposed as a power storage device packaging material that can be readily processed into various shapes, and can achieve a reduction in thickness and weight (see, for example, Patent Literature 1).

In such a power storage device packaging material, typically, a concave portion is formed by cold molding, a power storage device element including electrodes, an electrolytic solution, and the like is disposed in the space formed by the concave portion, and the heat-sealable resin layer is heat-sealed. As a result, a power storage device in which the power storage device element is housed in the power storage device packaging material is obtained.

CITATION LIST

Patent Literature

Patent Literature 1: JP 2008-287971 A
Patent Literature 2: JP 2013-101778 A

SUMMARY OF INVENTION

Technical Problem

In a film-shaped power storage device packaging material as described above, a polyolefin, such as polypropylene, may be used as the material to form the heat-sealable resin layer. For example, when polypropylene is used to form the heat-sealable resin layer, polyethylene may be used together to increase processability and flexibility.

However, polypropylene and polyethylene do not have high compatibility with each other. For example, when a small amount of polyethylene is added to polypropylene to form the heat-sealable resin layer by melt extrusion, a sea-island structure is formed in which the islands of polyethylene are dispersed in the sea of polypropylene (to observe the sea-island structure, a cross section of the heat-sealable resin layer is stained with ruthenium tetroxide or the like, and a cross-sectional image obtained with a scanning electron microscope is observed). Thus, when the power storage device packaging material is subjected to cold molding as described above, the stress applied during the molding may cause the formation of fine cracks at the interface between the polypropylene region and the polyethylene region of the heat-sealable resin layer, possibly leading to whitening of the heat-sealable resin layer and a decrease in the insulation properties of the power storage device packaging material.

For example, Patent Literature 2 describes that when an inner layer of a battery packaging material is formed of a mixture of a polypropylene resin and a polyethylene resin, the sealing strength between the heat-sealed inner layers can be controlled by controlling the size and number of the "islands", by controlling the conditions for producing the battery packaging material, the thickness of the inner layer, the mixture ratio of the polypropylene resin and the polyethylene resin, and the like. Patent Literature 2 also describes that in the mixture with a sea-island structure, the particle diameter of the polyethylene resin, that is, the size of the "islands", is preferably in the range of 0.5 to 5 μm (i.e., about 0.196 to 19.6 μm$^2$).

However, as a result of research by the present inventors, it was found that, because the particle diameter of the polyethylene resin is large in a conventional battery packaging material having an inner layer containing polypropylene and polyethylene as disclosed in Patent Literature 2, whitening and a decrease in the insulation properties due to molding cannot be sufficiently prevented.

Under such circumstances, it is a main object of the present disclosure to provide a power storage device packaging material comprising a heat-sealable resin layer containing polypropylene and polyethylene, in which whitening and a decrease in the insulation properties due to molding are prevented.

Solution to Problem

The inventors of the present disclosure have conducted extensive research to solve the aforementioned problem. As a result, the inventors have found that whitening and a decrease in the insulation properties due to molding are prevented in a power storage device packaging material comprising a laminate comprising at least a base material layer, a barrier layer, and a heat-sealable resin layer in this order from an outer side toward an inner side, wherein the heat-sealable resin layer contains polypropylene and polyethylene; with respect to a cross section of the heat-sealable resin layer in a thickness direction parallel to TD (Transverse Direction), a sea-island structure is observed in a cross-sectional image obtained with a scanning electron microscope; and in the cross-sectional image, relative to the total number of islands in the sea-island structure, the ratio of the total number of islands with an area of 0.02 μm$^2$ or less among the islands is 80.0% or more. The cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer. The TD and MD directions of the heat-sealable resin layer laminated on the laminate are usually distinguishable based on the below-described barrier layer. Specifically, in the power storage device packaging material, with respect to the below-described barrier layer, MD and TD in the production process are usually distinguishable. For example, when the barrier layer is formed of an aluminum foil, linear streaks, which are so-called rolling marks, are formed on the surface of the aluminum foil in the rolling direction (RD) of the aluminum foil. Because the rolling marks extend along the rolling direction, the rolling direction of the aluminum foil can be recognized by observing the surface of the aluminum foil. Moreover, because MD of the laminate usually corresponds to RD of the aluminum foil in the production process of the laminate, MD of the laminate (i.e., MD of the heat-sealable resin layer) can be identified by observing the surface of the aluminum foil of the laminate, and identifying the rolling direction (RD) of the aluminum foil. Furthermore, because TD of the laminate is perpendicular to MD of the laminate, TD of the laminate (i.e., TD of the heat-sealable resin layer) can also be identified.

The invention of the present disclosure has been completed as a result of further research based on these findings. In summary, the present disclosure provides an embodiment of the invention as set forth below:

A power storage device packaging material comprising a laminate comprising at least a base material layer, a barrier layer, and a heat-sealable resin layer in this order from an outer side toward an inner side, wherein
  the heat-sealable resin layer contains polypropylene and polyethylene,
  with respect to a cross section of the heat-sealable resin layer in a thickness direction parallel to TD, a sea-island structure is observed in a cross-sectional image obtained with a scanning electron microscope,
  the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer, and
  in the cross-sectional image, relative to the total number of islands in the sea-island structure, the ratio of the total number of islands with an area of 0.02 μm² or less among the islands is 80.0% or more.

Advantageous Effects of Invention

The present disclosure can provide a power storage device packaging material comprising a heat-sealable resin layer containing polypropylene and polyethylene, in which whitening and a decrease in the insulation properties due to molding are prevented. The present disclosure can also provide a method for producing a power storage device packaging material, and a power storage device.

DESCRIPTION OF EMBODIMENTS

A power storage device packaging material of the present disclosure comprises a laminate comprising at least a base material layer, a barrier layer, and a heat-sealable resin layer in this order from an outer side toward an inner side, wherein the heat-sealable resin layer contains polypropylene and polyethylene; with respect to a cross section of the heat-sealable resin layer in a thickness direction parallel to TD, a sea-island structure is observed in a cross-sectional image obtained with a scanning electron microscope; the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer; and in the cross-sectional image, relative to the total number of islands in the sea-island structure, the ratio of the total number of islands with an area of 0.02 μm² or less among the islands is 80.0% or more. In the power storage device packaging material of the present disclosure, because of these features, whitening and a decrease in the insulation properties due to molding are prevented.

The power storage device packaging material of the present disclosure will be hereinafter described in detail. In the present specification, any numerical range indicated by " . . . to . . . " is intended to mean " . . . or more" and " . . . or less". For example, the recitation "2 to 15 mm" is intended to mean 2 mm or more and 15 mm or less.

1. Laminated Structure of Power Storage Device Packaging Material

Figure 1:
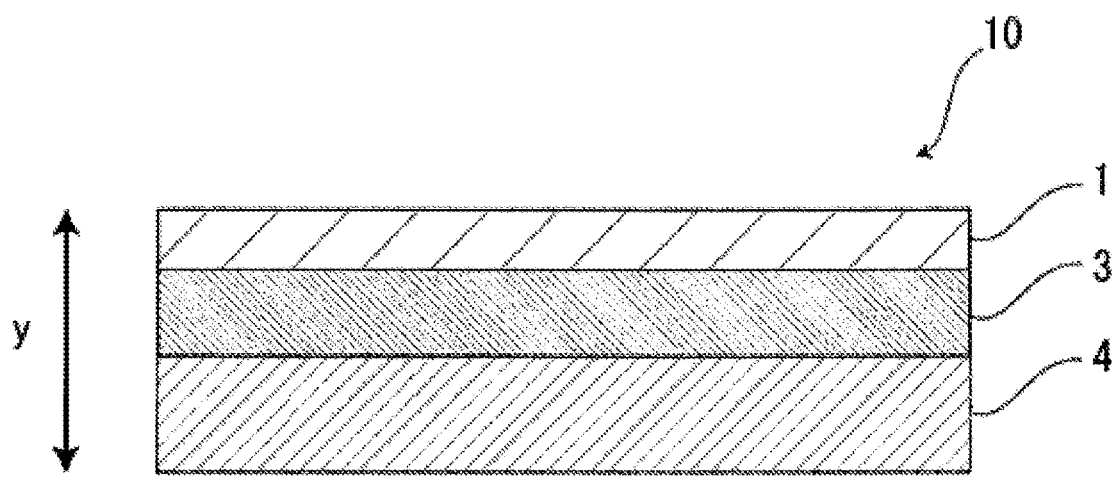
FIG. 1 is a schematic diagram showing one exemplary cross-sectional structure of a power storage device packaging material of the present disclosure.

As shown in FIG. 1, for example, a power storage device packaging material 10 of the present disclosure is formed of a laminate having a base material layer 1, a barrier layer 3, and a heat-sealable resin layer 4 in this order. In the power storage device packaging material 10, the base material layer 1 is the outermost layer, and the heat-sealable resin layer 4 is the innermost layer. During the assembly of a power storage device using the power storage device packaging material 10 and a power storage device element, the power storage device element is housed in the space formed by heat-sealing a peripheral region, with the heat-sealable resin layer 4 of the power storage device packaging material 10 opposed to another heat-sealable resin layer 4.

Figure 2:
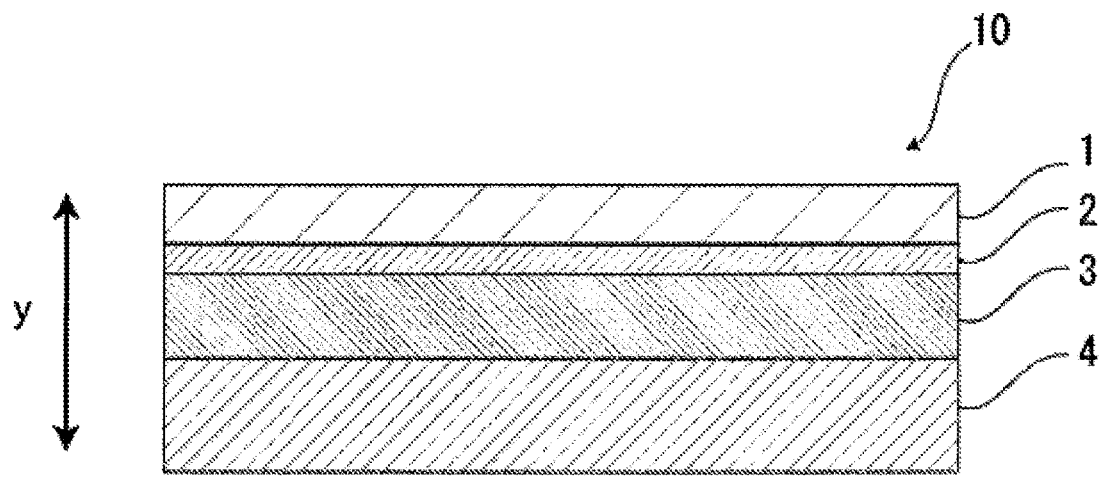
FIG. 2 is a schematic diagram showing one exemplary cross-sectional structure of a power storage device packaging material of the present disclosure.
Figure 3:
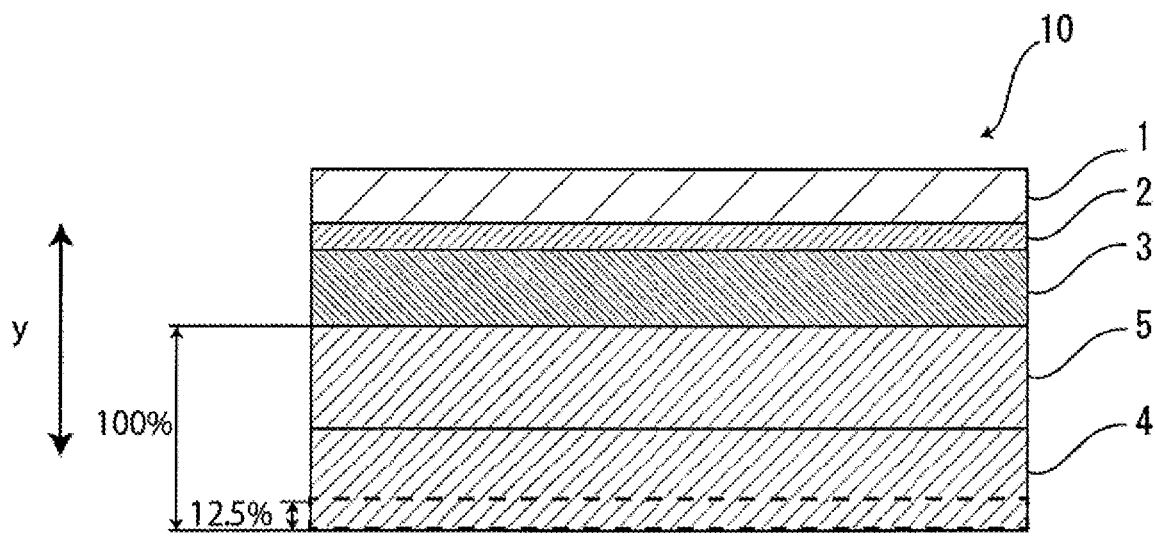
FIG. 3 is a schematic diagram showing one exemplary cross-sectional structure of a power storage device packaging material of the present disclosure.
Figure 4:
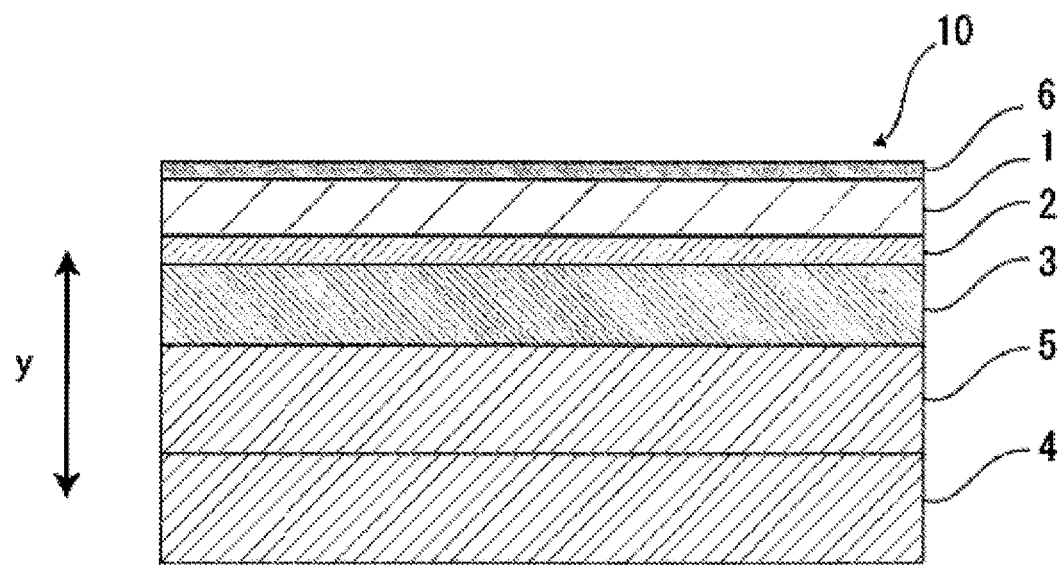
FIG. 4 is a schematic diagram showing one exemplary cross-sectional structure of a power storage device packaging material of the present disclosure.

As shown in FIGS. 2 to 4, for example, the power storage device packaging material 10 may optionally have an adhesive agent layer 2 between the base material layer 1 and the barrier layer 3, for the purpose of, for example, improving the adhesiveness between these layers. Moreover, as shown in FIGS. 3 and 4, for example, the power storage device packaging material 10 may also optionally have an adhesive layer 5 between the barrier layer 3 and the heat-sealable resin layer 4, for the purpose of, for example, improving the adhesiveness between these layers. Furthermore, as shown in FIG. 4, a surface coating layer 6 or the like may be optionally provided on the outer side of the base material layer 1 (opposite to the heat-sealable resin layer 4 side).

While the thickness of laminate that forms the power storage device packaging material 10 is not limited, from the viewpoint of reducing costs, improving the energy density, and the like, it is preferably about 180 μm or less, about 155 μm or less, or about 120 μm or less. On the other hand, from the viewpoint of maintaining the function of the power storage device packaging material to protect the power storage device element, the thickness of the laminate that forms the power storage device packaging material 10 is preferably about 35 μm or more, about 45 μm or more, or about 60 μm or more. Preferred ranges of the thickness of the laminate that forms the power storage device packaging material 10 include from about 35 to 180 μm, from about 35 to 155 μm, from about 35 to 120 μm, from about 45 to 180 μm, from about 45 to 155 μm, from about 45 to 120 μm, from about 60 to 180 μm, from about 60 to 155 μm, and from about 60 to 120 μm, with the range of about 60 to 155 μm being particularly preferred.

In the power storage device packaging material 10, the ratio of the total thickness of the base material layer 1, the optional adhesive agent layer 2, the barrier layer 3, the optional adhesive layer 5, the heat-sealable resin layer 4, and the optional surface coating layer 6, relative to the thickness (entire thickness) of the laminate that forms the power storage device packaging material 10, is preferably 90% or more, more preferably 95% or more, and still more preferably 98% or more. As a specific example, when the power storage device packaging material 10 of the present disclosure includes the base material layer 1, adhesive agent layer 2, barrier layer 3, adhesive layer 5, and heat-sealable resin layer 4, the ratio of the total thickness of these layers relative to the thickness (entire thickness) of the laminate that forms power storage device packaging material 10 is preferably 90% or more, more preferably 95% or more, and still more preferably 98% or more.

2. Layers That Form Power Storage Device Packaging Material

[Base Material Layer 1]

In the present disclosure, the base material layer 1 is a layer that is provided for the purpose of, for example, functioning as a base material of the power storage device packaging material. The base material layer 1 is positioned as the outermost layer of the power storage device packaging material.

The material that forms the base material layer 1 is not limited as long as it functions as a base material, i.e., has at least insulation properties. The base material layer 1 may be formed using a resin, for example, and the resin may contain additives as described below.

When the base material layer 1 is formed of a resin, the base material layer 1 may be, for example, a resin film formed of the resin, or may be formed by applying the resin. The resin film may be an unstretched film or a stretched film. The stretched film may be, for example, a uniaxially stretched film or a biaxially stretched film, and is preferably a biaxially stretched film. Examples of stretching methods for forming a biaxially stretched film include a sequential biaxial stretching method, an inflation method, and a simultaneous biaxial stretching method. Examples of methods of applying the resin include a roll coating method, a gravure coating method, and an extrusion coating method.

Examples of the resin that forms the base material layer 1 include resins such as polyesters, polyamides, polyolefins, epoxy resins, acrylic resins, fluororesins, polyurethanes, silicone resins, and phenol resins, as well as modified resins thereof. The resin that forms the base material layer 1 may also be a copolymer of these resins or a modified copolymer thereof. The resin that forms the base material layer 1 may also be a mixture of these resins.

Among the above, polyesters and polyamides, for example, are preferred as the resin that forms the base material layer 1.

Specific examples of polyesters include polyethylene terephthalate, polybutylene terephthalate, polyethylene naphthalate, polybutylene naphthalate, polyethylene isophthalate, and copolyesters. Examples of copolyesters include copolyesters containing ethylene terephthalate as a main repeating unit. Specific examples of these copolyesters include copolyesters obtained by polymerizing ethylene terephthalate as a main repeating unit with ethylene isophthalate (abbreviated as polyethylene (terephthalate/isophthalate); hereinafter similarly abbreviated), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). These polyesters may be used alone or in combination.

Specific examples of polyamides include aliphatic polyamides, such as nylon 6, nylon 66, nylon 610, nylon 12, nylon 46, and copolymers of nylon 6 and nylon 66; polyamides containing aromatics, such as hexamethylenediamine-isophthalic acid-terephthalic acid copolyamides containing structural units derived from terephthalic acid and/or isophthalic acid, for example, nylon 6I, nylon 6T, nylon 6IT, and nylon 6I6T (I denotes isophthalic acid, and T denotes terephthalic acid), and polyamide MXD6 (polymethaxylylene adipamide); cycloaliphatic polyamides, such as polyamide PACM6 (polybis(4-aminocyclohexyl)methane adipamide); polyamides copolymerized with a lactam component or an isocyanate component such as 4,4'-diphenylmethane-diisocyanate, and polyester amide copolymers or polyether ester amide copolymers that are copolymers of copolyamides with polyesters or polyalkylene ether glycols; and copolymers thereof. These polyamides may be used alone or in combination.

The base material layer 1 preferably contains at least one of a polyester film, a polyamide film, and a polyolefin film, more preferably contains at least one of a stretched polyester film, a stretched polyamide film, and a stretched polyolefin film, still more preferably contains at least one of a stretched polyethylene terephthalate film, a stretched polybutylene terephthalate film, a stretched nylon film, and a stretched polypropylene film, and even more preferably contains at least one of a biaxially stretched polyethylene terephthalate film, a biaxially stretched polybutylene terephthalate film, a biaxially stretched nylon film, and a biaxially stretched polypropylene film.

The base material layer 1 may be composed of a single layer or two or more layers. When the base material layer 1 is composed of two or more layers, it may be a laminate in which resin films are laminated with an adhesive or the like, or may be a laminate of two or more layers of resin films formed by co-extruding resins. The laminate of two or more layers of resin films formed by co-extruding resins may be used in an unstretched state as the base material layer 1, or may be uniaxially or biaxially stretched and used as the base material layer 1.

Specific examples of laminates of two or more layers of resin films for the base material layer 1 include a laminate of a polyester film and a nylon film, a laminate of two or more layers of nylon films, and a laminate of two or more layers of polyester films. Preferred are a laminate of a stretched nylon film and a stretched polyester film, a laminate of two or more layers of stretched nylon films, and a laminate of two or more layers of stretched polyester films. For example, when the base material layer 1 is a laminate of two layers of resin films, it is preferably a laminate of a polyester resin film and a polyester resin film, a laminate of a polyamide resin film and a polyamide resin film, or a laminate of a polyester resin film and a polyamide resin film, and more preferably a laminate of a polyethylene terephthalate film and a polyethylene terephthalate film, a laminate of a nylon film and a nylon film, or a laminate of a polyethylene terephthalate film and a nylon film. When the base material layer 1 is a laminate of two or more layers of resin films, it is preferred that a polyester resin film be positioned as the outermost layer of the base material layer 1, because polyester resin is unlikely to discolor when, for example, the electrolytic solution adheres to the surface.

When the base material layer 1 is a laminate of two or more layers of resin films, the two or more layers of resin films may be laminated with an adhesive therebetween. Examples of preferred adhesives are the same adhesives as those mentioned for the adhesive agent layer 2 described below. The method of laminating two or more layers of resin films is not limited, and may be any of known methods, for example, a dry lamination method, a sandwich lamination method, an extrusion lamination method, and a thermal lamination method, preferably a dry lamination method. When the lamination is performed using a dry lamination method, a polyurethane adhesive is preferably used as an adhesive. In this case, the thickness of the adhesive is, for example, about 2 to 5 μm. An anchor coat layer may also be formed and laminated on the resin films. Examples of the anchor coat layer are the same adhesives as those mentioned for the adhesive agent layer 2 described below. In this case, the thickness of the anchor coat layer is, for example, about 0.01 to 1.0 μm.

At least one of the surface and the inside of the base material layer 1 may contain additives, such as lubricants, flame retardants, anti-blocking agents, antioxidants, light stabilizers, tackifiers, and anti-static agents. A single additive may be used alone, or a mixture of two or more additives may be used.

In the present disclosure, it is preferred that a lubricant be present on the surface of the base material layer 1, from the viewpoint of improving the moldability of the power storage device packaging material. While the lubricant is not limited, it is preferably an amide-based lubricant. Specific examples of amide-based lubricants include saturated fatty acid amides, unsaturated fatty acid amides, substituted amides, methylol amides, saturated fatty acid bis-amides, unsaturated fatty acid bis-amides, fatty acid ester amides, and aromatic bis-amides. Specific examples of saturated fatty acid amides include lauramide, palmitamide, stearamide, behenamide, and hydroxystearamide. Specific examples of unsaturated fatty acid amides include oleamide and erucamide. Specific examples of substituted amides include N-oleyl palmitamide, N-stearyl stearamide, N-stearyl oleamide, N-oleyl stearamide, and N-stearyl erucamide. Specific examples of methylol amides include methylol stearamide. Specific examples of saturated fatty acid bis-amides include methylene-bis-stearamide, ethylene-bis-capramide, ethylene-bis-lauramide, ethylene-bis-stearamide, ethylene-bis-hydroxystearamide, ethylene-bis-behenamide, hexamethylene-bis-stearamide, hexamethylene-bis-behenamide, hexamethylene hydroxystearamide, N,N'-distearyl adipamide, and N,N'-distearyl sebacamide. Specific examples of unsaturated fatty acid bis-amides include ethylene-bis-oleamide, ethylene-bis-erucamide, hexamethylene-bis-oleamide, N,N'-dioleyl adipamide, and N,N'-dioleyl sebacamide. Specific examples of fatty acid ester amides include stearamide ethyl stearate. Specific examples of aromatic bis-amides include m-xylylene-bis-stearamide, m-xylylene-bis-hydroxystearamide, and N,N'-distearyl isophthalamide. These lubricants may be used alone or in combination.

When a lubricant is present on the surface of the base material layer 1, the amount of the lubricant present is not limited, but is preferably about 3 mg/m$^2$ or more, more preferably about 4 to 15 mg/m$^2$, and still more preferably about 5 to 14 mg/m$^2$.

The lubricant present on the surface of the base material layer 1 may be exuded from the lubricant contained in the resin that forms the base material layer 1, or may be applied to the surface of the base material layer 1.

While the thickness of the base material layer 1 is not limited as long as the function as a base material is exhibited, it is, for example, about 3 to 50 μm, and preferably about 10 to 35 μm. When the base material layer 1 is a laminate of two or more layers of resin films, the thickness of the resin film that forms each layer is preferably about 2 to 25 μm.

[Adhesive Agent Layer 2]

In the power storage device packaging material of the present disclosure, the adhesive agent layer 2 is a layer that is optionally provided between the base material layer 1 and the barrier layer 3, for the purpose of improving the adhesiveness between these layers.

The adhesive agent layer 2 is formed of an adhesive capable of bonding the base material layer 1 and the barrier layer 3. While the adhesive used for forming the adhesive agent layer 2 is not limited, it may be any of a chemical reaction type, a solvent volatilization type, a heat melting type, a heat pressing type, and the like. The adhesive may also be a two-liquid curable adhesive (two-liquid adhesive), a one-liquid curable adhesive (one-liquid adhesive), or a resin that does not involve a curing reaction. The adhesive agent layer 2 may be composed of a single layer or a plurality of layers.

Specific examples of adhesive components contained in the adhesive include polyesters, such as polyethylene terephthalate, polybutylene terephthalate, polyethylene naphthalate, polybutylene naphthalate, polyethylene isophthalate, and copolyesters; polyethers; polyurethanes; epoxy resins; phenol resins; polyamides, such as nylon 6, nylon 66, nylon 12, and copolyamides; polyolefin-based resins, such as polyolefins, cyclic polyolefins, acid-modified polyolefins, and acid-modified cyclic polyolefins; polyvinyl acetates; celluloses; (meth)acrylic resins; polyimides; polycarbonates; amino resins, such as urea resins and melamine resins; rubbers, such as chloroprene rubber, nitrile rubber, and styrene-butadiene rubber; and silicone resins. These adhesive components may be used alone or in combination. Preferred among these adhesive components is a polyurethane adhesive, for example. Moreover, the resin that serves as an adhesive component can be used in combination with an appropriate curing agent to improve the adhesive strength. The curing agent is appropriately selected from a polyisocyanate, a polyfunctional epoxy resin, an oxazoline group-containing polymer, a polyamine resin, an acid anhydride, and the like, depending on the functional group of the adhesive component.

The polyurethane adhesive may be, for example, a polyurethane adhesive containing a base resin containing a polyol compound and a curing agent containing an isocyanate compound. The polyurethane adhesive is preferably a two-liquid curable polyurethane adhesive containing a polyol such as a polyester polyol, a polyether polyol, or an acrylic polyol as a base resin, and an aromatic or aliphatic polyisocyanate as a curing agent. The polyol compound is preferably a polyester polyol having a hydroxy group at a side chain, in addition to the hydroxy groups at the ends of the repeating unit. When the adhesive agent layer 2 is formed of a polyurethane adhesive, the power storage device packaging material is provided with excellent electrolytic solution resistance, which prevents the base material layer 1 from peeling off even if the electrolytic solution adheres to the side surface.

The adhesive agent layer 2 may be blended with other components as long as they do not interfere with adhesiveness, and may contain colorants, thermoplastic elastomers, tackifiers, fillers, and the like. When the adhesive agent layer 2 contains a colorant, the power storage device packaging material can be colored. The colorant may be any of known colorants, such as a pigment or a dye. A single colorant may be used, or a mixture of two or more colorants may be used.

The pigment is not limited in type as long as it does not interfere with the adhesiveness of the adhesive agent layer 2. Examples of organic pigments include azo-based, phthalocyanine-based, quinacridone-based, anthraquinone-based, dioxazine-based, indigo/thioindigo-based, perinone-perylene-based, isoindolenine-based, and benzimidazolone-based pigments. Examples of inorganic pigments include carbon black-based, titanium oxide-based, cadmium-based, lead-based, chromium oxide-based, and iron-based pigments. Other examples include mica powder and fish scale flakes.

Among these colorants, carbon black is preferred, in order to make the external appearance of the power storage device packaging material black, for example.

The average particle diameter of the pigment is not limited, and may be, for example, about 0.05 to 5 μm, and preferably about 0.08 to 2 μm. The average particle diameter of the pigment is the median diameter measured using a laser diffraction/scattering particle size distribution analyzer.

The pigment content in the adhesive agent layer 2 is not limited as long as the power storage device packaging material is colored; for example, it is about 5 to 60% by mass, and preferably 10 to 40% by mass.

While the thickness of the adhesive agent layer 2 is not limited as long as the base material layer 1 and the barrier layer 3 can be bonded, it is, for example, about 1 μm or more or about 2 μm or more. On the other hand, the thickness of the adhesive agent layer 2 is, for example, about 10 μm or less or about 5 μm or less. Preferred ranges of the thickness of the adhesive agent layer 2 include from about 1 to 10 μm, from about 1 to 5 μm, from about 2 to 10 μm, and from about 2 to 5 μm.

[Coloring Layer]

A coloring layer (not illustrated) is a layer that is optionally provided between the base material layer 1 and the barrier layer 3. When the adhesive agent layer 2 is provided, the coloring layer may be provided between the base material layer 1 and the adhesive agent layer 2 or between the adhesive agent layer 2 and the barrier layer 3. Alternatively, the coloring layer may be provided on the outer side of the base material layer 1. The power storage device packaging material can be colored by providing the coloring layer.

The coloring layer can be formed, for example, by applying an ink containing a colorant to the surface of the base material layer 1 or the surface of the barrier layer 3. The colorant may be any of known colorants, such as a pigment or a dye. A single colorant may be used, or a mixture of two or more colorants may be used.

Specific examples of the colorant contained in the coloring layer are the same as those mentioned in the [Adhesive Agent Layer 2] section.

[Barrier Layer 3]

In the power storage device packaging material, the barrier layer 3 is a layer that at least prevents the ingress of moisture.

The barrier layer 3 may be, for example, a metal foil, a vapor-deposited film, or a resin layer having barrier properties. Examples of the vapor-deposited film include a vapor-deposited metal film, a vapor-deposited inorganic oxide film, and a vapor-deposited carbon-containing inorganic oxide film. Examples of the resin layer include fluorine-containing resins, such as polyvinylidene chloride, polymers containing chlorotrifluoroethylene (CTFE) as a main component, polymers containing tetrafluoroethylene (TFE) as a main component, polymers with fluoroalkyl groups, and polymers with fluoroalkyl units as a main component; and ethylene-vinyl alcohol copolymers. The barrier layer 3 may also be, for example, a resin film having at least one of these vapor-deposited films and resin layers. A plurality of barrier layers 3 may be provided. The barrier layer 3 preferably includes a layer formed of a metal material. Specific examples of metal materials that form the barrier layer 3 include aluminum alloys, stainless steel, titanium steel, and steel sheets. When the barrier layer 3 is a metal foil, it preferably includes at least one of an aluminum alloy foil and a stainless steel foil.

The aluminum alloy foil is more preferably a soft aluminum alloy foil formed of an annealed aluminum alloy, for example, from the viewpoint of improving the moldability of the power storage device packaging material, and is more preferably an aluminum alloy foil containing iron, from the viewpoint of further improving the moldability. In the aluminum alloy foil (100% by mass) containing iron, the iron content is preferably 0.1 to 9.0% by mass, and more preferably 0.5 to 2.0% by mass. When the iron content is 0.1% by mass or more, the power storage device packaging material can be provided with superior moldability. When the iron content is 9.0% by mass or less, the power storage device packaging material can be provided with superior flexibility. Examples of soft aluminum alloy foils include aluminum alloy foils having the compositions as specified in JIS H4160: 1994 A8021 H-O, JIS H4160: 1994 A8079 H-O, JIS H4000: 2014 A8021 P-O, and JIS H4000: 2014 A8079 P-O. These aluminum alloy foils may be optionally blended with silicon, magnesium, copper, manganese, and the like. The softening may be performed by annealing, for example.

Examples of the stainless steel foil include austenitic, ferritic, austenitic-ferritic, martensitic, and precipitation-hardening stainless steel foils. The stainless steel foil is preferably formed of an austenitic stainless steel, from the viewpoint of providing the power storage device packaging material with superior moldability.

Specific examples of the austenitic stainless steel that forms the stainless steel foil include SUS304, SUS301, and SUS316L, with SUS304 being particularly preferred.

The thickness of the barrier layer 3 as a metal foil may be such that it is sufficient to exhibit at least the function of the barrier layer to prevent the ingress of moisture, and may be, for example, about 9 to 200 μm. The thickness of the barrier layer 3 is preferably about 85 μm or less, more preferably about 50 μm or less, still more preferably about 40 μm or less, and particularly preferably about 35 μm or less. On the other hand, the thickness of the barrier layer 3 is preferably about 10 μm or more, more preferably about 20 μm or more, and still more preferably about 25 μm or more. Preferred ranges of the thickness include from about 10 to 85 μm, from about 10 to 50 μm, from about 10 to 40 μm, from about 10 to 35 μm, from about 20 to 85 μm, from about 20 to 50 μm, from about 20 to 40 μm, from about 20 to 35 μm, from about 25 to 85 μm, from about 25 to 50 μm, from about 25 to 40 μm, and from about 25 to 35 μm. When the barrier layer 3 is formed of an aluminum alloy foil, the above-defined ranges are particularly preferred. In particular, when the barrier layer 3 is formed of a stainless steel foil, the thickness of the stainless steel foil is preferably about 60 μm or less, more preferably about 50 μm or less, still more preferably about 40 μm or less, even more preferably about 30 μm or less, and particularly preferably about 25 μm or less. On the other hand, the thickness of the stainless steel foil is preferably about 10 μm or more, and more preferably about 15 μm or more. Preferred ranges of the thickness of the stainless steel foil include from about 10 to 60 μm, from about 10 to 50 μm, from about 10 to 40 μm, from about 10 to 30 μm, from about 10 to 25 μm, from about 15 to 60 μm, from about 15 to 50 μm, from about 15 to 40 μm, from about 15 to 30 μm, and from about 15 to 25 μm.

When the barrier layer 3 is a metal foil, the barrier layer 3 preferably has a corrosion-resistant film at least on a surface opposite to the base material layer, in order to prevent dissolution or corrosion, for example. The barrier layer 3 may have corrosion-resistant films on both surfaces. As used herein, the term "corrosion-resistant film" refers to a thin film that imparts corrosion resistance to the barrier layer, and is formed by subjecting a surface of the barrier layer to, for example, hydrothermal conversion treatment such as boehmite treatment, chemical conversion treatment, anodic oxidation treatment, plating treatment with nickel, chromium, or the like, or anti-corrosion treatment of applying a coating agent. A single treatment or a combination of two or more treatments may be performed to form the corrosion-resistant film. The corrosion-resistant film may not necessarily be composed of a single layer, and may also be composed of a plurality of layers. Among these treatments, the hydrothermal conversion treatment and the anodic oxidation treatment are treatments in which the surface of the metal foil is dissolved with a treatment agent to form a metal compound with excellent corrosion resistance. These treatments may be included in the definition of the chemical conversion treatment. When the barrier layer 3 has a corrosion-resistant film, the barrier layer 3 is defined as including the corrosion-resistant film.

The corrosion-resistant film exhibits the effect of preventing delamination between the barrier layer (for example, an aluminum alloy foil) and the base material layer during molding of the power storage device packaging material, preventing dissolution or corrosion of the barrier layer surface, particularly dissolution or corrosion of aluminum oxide present on the barrier layer surface when the barrier layer is an aluminum alloy foil, due to hydrogen fluoride produced by the reaction between the electrolyte and moisture, and improving the adhesiveness (wettability) of the barrier layer surface to prevent delamination between the base material layer and the barrier layer during heat-sealing, and prevent delamination between the base material layer and the barrier layer during molding.

Various corrosion-resistant films formed by the chemical conversion treatment are known, and typical examples include a corrosion-resistant film containing at least one of phosphates, chromates, fluorides, triazine-thiol compounds, and rare earth oxides. Examples of the chemical conversion treatment using phosphates and chromates include chromic acid chromate treatment, phosphoric acid chromate treatment, phosphate-chromate treatment, and chromate treatment. Examples of chromium compounds used in these treatments include chromium nitrate, chromium fluoride, chromium sulfate, chromium acetate, chromium oxalate, chromium biphosphate, acetylacetate chromate, chromium chloride, and chromium potassium sulfate. Examples of phosphorus compounds used in these treatments include sodium phosphate, potassium phosphate, ammonium phosphate, and polyphosphoric acid. Moreover, examples of chromate treatment include etching chromate treatment, electrolytic chromate treatment, and coating-type chromate treatment, with coating-type chromate treatment being preferred. Coating-type chromate treatment is performed as follows: Initially, at least the inner layer-side surface of the barrier layer (for example, an aluminum alloy foil) is subjected to degreasing treatment, using a well-known treatment method such as an alkali immersion method, an electrolytic cleaning method, an acid cleaning method, an electrolytic acid cleaning method, or an acid activation method. Then, a treatment solution containing, as a main component, a phosphoric acid metal salt such as Cr (chromium) phosphate, Ti (titanium) phosphate, Zr (zirconium) phosphate, or Zn (zinc) phosphate, or a mixture of these metal salts, or a treatment solution containing, as a main component, a phosphoric acid non-metal salt or a mixture of such non-metal salts, or a treatment solution containing a mixture of any of the above with a synthetic resin or the like, is applied to the degreasing treatment surface, using a well-known coating method such as a roll coating method, a gravure printing method, or an immersion method, and dried. The treatment solution may be formed using any of various solvents, such as, for example, water, alcohol solvents, hydrocarbon solvents, ketone solvents, ester solvents, and ether solvents, with water being preferred. Moreover, for example, a polymer such as a phenolic resin or an acrylic resin may be used here as a resin component, and chromate treatment using an aminated phenol polymer having any of the repeating units represented by the general formulae (1) to (4) shown below may be employed, for example. The aminated phenol polymer may contain one of or any combination of the repeating units represented by the general formulae (1) to (4). The acrylic resin is preferably polyacrylic acid, an acrylic acid-methacrylic acid ester copolymer, an acrylic acid-maleic acid copolymer, an acrylic acid-styrene copolymer, or a derivative thereof, such as a sodium, ammonium, or amine salt. In particular, the acrylic resin is preferably a derivative of polyacrylic acid, such as an ammonium, sodium, or amine salt of polyacrylic acid. As used herein, the term "polyacrylic acid" refers to a polymer of acrylic acid. Alternatively, the acrylic resin is preferably a copolymer of acrylic acid with a dicarboxylic acid or a dicarboxylic anhydride, or preferably an ammonium, sodium, or amine salt of the copolymer of acrylic acid with a dicarboxylic acid or a dicarboxylic anhydride. A single acrylic resin may be used alone, or a mixture of two or more of acrylic resins may be used.

[Chem. 1]

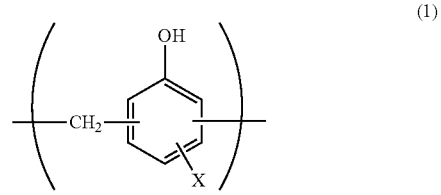

(1)

[Chem. 2]

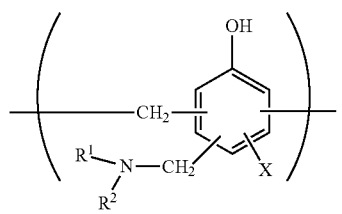

(2)

[Chem. 3]

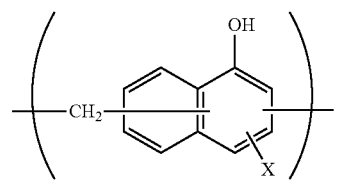

(3)

[Chem. 4]

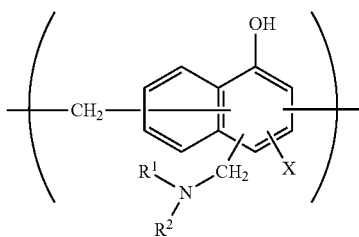

(4)

In the general formulae (1) to (4), X represents a hydrogen atom, a hydroxy group, an alkyl group, a hydroxyalkyl group, an allyl group, or a benzyl group. $R^1$ and $R^2$ are the same or different, and each represent a hydroxy group, an alkyl group, or a hydroxyalkyl group. In the general formulae (1) to (4), examples of alkyl groups represented by X, $R^1$, and $R^2$ include linear or branched alkyl groups with 1 to 4 carbon atoms, such as methyl, ethyl, n-propyl, isopropyl, n-butyl, isobutyl, and tert-butyl groups. Examples of hydroxyalkyl groups represented by X, $R^1$, and $R^2$ include linear or branched alkyl groups with 1 to 4 carbon atoms, which are substituted with one hydroxy group, such as a hydroxymethyl, 1-hydroxyethyl, 2-hydroxyethyl, 1-hydroxypropyl, 2-hydroxypropyl, 3-hydroxypropyl, 1-hydroxybutyl, 2-hydroxybutyl, 3-hydroxybutyl, or 4-hydroxybutyl group. In the general formulae (1) to (4), the alkyl groups and the hydroxyalkyl groups represented by X, $R^1$, and $R^2$ may be the same or different. In the general formulae (1) to (4), X is preferably a hydrogen atom, a hydroxy group, or a hydroxyalkyl group. The number average molecular weight of the aminated phenol polymer having any of the repeating units represented by the general formulae (1) to (4) is, for example, about 500 to 1,000,000, preferably about 1,000 to 20,000. The aminated phenol polymer is produced, for example, by polycondensing a phenol compound or a naphthol compound with formaldehyde to produce a polymer composed of the repeating unit represented by the general formula (1) or (3) above, and then introducing a functional group (—$CH_2NR^1R^2$) into the polymer obtained above using formaldehyde and an amine ($R^1R^2NH$). A single aminated phenol polymer may be used alone, or a mixture of two or more aminated phenol polymers may be used.

Other examples of the corrosion-resistant film include a thin film formed by coating-type anti-corrosion treatment in which a coating agent containing at least one selected from the group consisting of a rare earth element oxide sol, an anionic polymer, and a cationic polymer is applied. The coating agent may also contain phosphoric acid or a phosphate and a crosslinking agent that crosslinks the polymer. In the rare earth element oxide sol, fine particles of a rare earth element oxide (for example, particles with an average particle diameter of 100 nm or less) are dispersed in a liquid dispersion medium. Examples of the rare earth element oxide include cerium oxide, yttrium oxide, neodymium oxide, and lanthanum oxide, with cerium oxide being preferred from the viewpoint of further improving the adhesion. A single rare earth element oxide or a combination of two or more rare earth element oxides may be contained in the corrosion-resistant film. The liquid dispersion medium of the rare earth element oxide sol may be any of various solvents, such as, for example, water, alcohol solvents, hydrocarbon solvents, ketone solvents, ester solvents, and ether solvents, with water being preferred. Examples of the cationic polymer include polyethyleneimine, ion polymer complexes composed of polymers containing polyethyleneimine and carboxylic acids, primary amine-grafted acrylic resins obtained by grafting primary amines to an acrylic backbone, polyallylamine or derivatives thereof, and aminated phenols. The anionic polymer is preferably a copolymer that contains, as a main component, poly(meth)acrylic acid or a salt thereof, or (meth)acrylic acid or a salt thereof. The crosslinking agent is preferably at least one selected from the group consisting of compounds with any of an isocyanate group, a glycidyl group, a carboxyl group, and an oxazoline group as a functional group, and silane coupling agents. The phosphoric acid or phosphate is preferably condensed phosphoric acid or a condensed phosphate.

One exemplary corrosion-resistant film is formed by coating the surface of the barrier layer with a dispersion in phosphoric acid of fine particles of a metal oxide, such as aluminum oxide, titanium oxide, cerium oxide, or tin oxide, or barium sulfate, and baking at 150° C. or more.

The corrosion-resistant film may optionally have a laminated structure in which at least one of a cationic polymer and an anionic polymer is additionally laminated. Examples of the cationic polymer and the anionic polymer are those as mentioned above.

The composition of the corrosion-resistant film can be analyzed using, for example, time-of-flight secondary ion mass spectrometry.

While the amount of the corrosion-resistant film to be formed on the surface of the barrier layer 3 by the chemical conversion treatment is not limited, in the case of employing, for example, coating-type chromate treatment, it is preferred that the chromic acid compound be contained in an amount of about 0.5 to 50 mg, for example, preferably about 1.0 to 40 mg, calculated as chromium, the phosphorus compound be contained in an amount of about 0.5 to 50 mg, for example, preferably about 1.0 to 40 mg, calculated as phosphorus, and the aminated phenol polymer be contained in an amount of about 1 to 200 mg, for example, preferably about 5.0 to 150 mg, per $m^2$ of the surface of the barrier layer 3.

While the thickness of the corrosion-resistant film is not limited, it is preferably about 1 nm to 20 µm, more preferably about 1 to 100 nm, and still more preferably about 1 to 50 nm, from the viewpoint of the cohesive force of the film, and the adhesion force between the barrier layer and the heat-sealable resin layer. The thickness of the corrosion-resistant film can be measured by observation with a transmission electron microscope, or a combination of observation with a transmission electron microscope and energy dispersive X-ray spectroscopy or electron energy loss spectroscopy. As a result of the analysis of the composition of the corrosion-resistant film using time-of-flight secondary ion mass spectrometry, a peak derived from, for example, secondary ions of Ce, P, and O (for example, at least one of $Ce_2PO_4^+$, $CePO_4^-$, and the like) or a peak derived from, for example, secondary ions of Cr, P, and O (for example, at least one of $CrPO_2^+$, $CrPO_4^-$, and the like) is detected.

The chemical conversion treatment is performed by applying the solution containing the compound to be used for forming the corrosion-resistant film to a surface of the barrier layer, using a bar coating method, a roll coating method, a gravure coating method, an immersion method, or the like, followed by heating such that the temperature of the barrier layer is increased to about 70 to 200° C. Before the barrier layer is subjected to the chemical conversion treatment, the barrier layer may be subjected to the degreasing treatment using an alkali immersion method, an electrolytic cleaning method, an acid cleaning method, an electrolytic acid cleaning method, or the like. The degreasing treatment allows the chemical conversion treatment of the surface of the barrier layer to be more efficiently performed. Alternatively, by using an acid degreasing agent in which a fluorine-containing compound is dissolved in an inorganic acid in the degreasing treatment, it is possible to achieve not only the effect of degreasing the metal foil, but also to form a passive metal fluoride. In this case, only the degreasing treatment may be performed.

[Heat-Sealable Resin Layer 4]

In the power storage device packaging material of the present disclosure, the heat-sealable resin layer 4 corresponds to the innermost layer, and is a layer (sealant layer) that is heat-sealed with the other heat-sealable resin layer 4 during the assembly of a power storage device to exhibit the function of hermetically sealing the power storage device element.

The heat-sealable resin layer 4 contains polypropylene and polyethylene. In the power storage device packaging material of the present disclosure, with respect to a cross section of the heat-sealable resin layer 4 in a thickness direction y parallel to TD, a sea-island structure is observed in a cross-sectional image obtained with a scanning electron microscope. As shown in the schematic diagram of FIG. 3, for example, the cross-sectional image is such that when the total thickness of the layers positioned closer to the inner side than the barrier layer 3 is taken as 100%, the cross-sectional image is obtained within a range (region surrounded by the dashed lines in FIG. 3) of thicknesses of up to 12.5% from the surface opposite to the barrier layer 3 side of the heat-sealable resin layer 4. The thickness is 0% at the surface opposite to the barrier layer 3 side of the heat-sealable resin layer 4. Specifically speaking, for example, as in Examples 1 and 2 described below, in the case of a power storage device packaging material in which a base material layer (thickness including the adhesive: 30 μm)/adhesive agent layer (3 μm)/barrier layer (40 μm)/adhesive layer (40 μm)/heat-sealable resin layer (40 μm) are laminated in this order, the layers positioned closer to the inner side than the barrier layer 3 are the adhesive layer (40 μm) and the heat-sealable resin layer (40 μm), and thus, a total thickness of 80 μm of these layers is taken as 100%. The position of the surface opposite to the barrier layer 3 side of the heat-sealable resin layer 4 is, in other words, the surface of the inside (inner surface) of the power storage device packaging material 10, and the thickness at this position is taken as 0%. Then, a cross-sectional image is obtained within the range from this surface (thickness 0%) to the position at a thickness of 12.5% (i.e., relative to a total of 80 μm taken as 100%, the position at a thickness of 12.5% is the position at a thickness of 10 μm toward the barrier layer 3 side from the surface opposite to the barrier layer 3 side of the heat-sealable resin layer 4).

By the phrase "a sea-island structure is observed in a cross-sectional image" is meant that the sea region (sea) and the island regions (islands) are observed in the cross-sectional image. As described above, when a small amount of polyethylene is added to polypropylene to form a heat-sealable resin layer by melt extrusion, a sea-island structure is formed in which the islands of polyethylene are dispersed in the sea of polypropylene. As described below, to observe the sea-island structure, a cross section of the heat-sealable resin layer is stained with ruthenium tetroxide or the like, and a cross-sectional image obtained with a scanning electron microscope is observed.

In the power storage device packaging material of the present disclosure, in the cross-sectional image of the heat-sealable resin layer 4, relative to the total number of islands in the sea-island structure, the ratio of the total number of islands with an area of 0.02 μm² or less among the islands is 80.0% or more. Because the power storage device packaging material of the present disclosure has this feature, whitening of the heat-sealable resin layer and a decrease in the insulation properties of the power storage device packaging material due to cold molding of the power storage device packaging material are prevented. More specifically, it is believed that, in the power storage device packaging material of the present disclosure, in the heat-sealable resin layer 4 containing polypropylene and polyethylene, the ratio of the very fine islands with an area of 0.02 μm² or less, among all the islands, is set high, so that the formation of fine cracks at the interface between the polypropylene region and the polyethylene region of the heat-sealable resin layer is effectively prevented, and consequently, whitening of the heat-sealable resin layer 4 and a decrease in the insulation properties of the power storage device packaging material due to cold molding of the power storage device packaging material are prevented.

In the cross-sectional image of the heat-sealable resin layer 4, relative to the total number of islands in the sea-island structure, the ratio of the total number of islands with an area of 0.02 μm² or less among the islands (total number of islands with an area of 0.02 μm² or less/total number of all the islands) is not limited as long as it is 80.0% or more; however, from the viewpoint of more effectively preventing the above-described whitening and decrease in the insulation properties, it is preferably 90.0% or more, and more preferably 95.0% or more. On the other hand, the above-mentioned ratio of the total number is, for example, 100.0% or less, 99.0% or less, or 98.0% or less. Preferred ranges of the above-mentioned ratio of the total number include from about 80.0 to 100.0%, from about 80.0 to 99.0%, from about 80.0 to 98.0%, from about 90.0 to 100.0%, from about 90.0 to 99.0%, from about 90.0 to 98.0%, from about 95.0 to 100.0%, from about 95.0 to 99.0%, and from about 95.0 to 98.0%.

Moreover, from the viewpoint of even more effectively preventing the above-described whitening and decrease in the insulation properties, in the cross-sectional image of the heat-sealable resin layer 4, relative to the total number of islands in the sea-island structure, the ratio of the total number of islands with an area of 0.01 μm² or less among the islands (total number of islands with an area of 0.01 µm² or less/total number of all the islands) is preferably 50.0% or more, more preferably 55.0% or more, and still more preferably 60.0% or more. On the other hand, the above-mentioned ratio of the total number is, for example, 80.0% or less, 75.0% or less, or 70.0% or less. Preferred ranges of the above-mentioned ratio of the total number include from about 50.0 to 80.0%, from about 50.0 to 75.0%, from about 50.0 to 70.0%, from about 55.0 to 80.0%, from about 55.0 to 75.0%, from about 55.0 to 70.0%, from about 60.0 to 80.0%, from about 60.0 to 75.0%, and from about 60.0 to 70.0%.

Moreover, from the viewpoint of even more effectively preventing the above-described whitening and decrease in the insulation properties, in the cross-sectional image of the heat-sealable resin layer 4, relative to the total number of islands in the sea-island structure, the ratio of the total number of islands with an area of 0.03 µm² or less among the islands (total number of islands with an area of 0.03 µm² or less/total number of all the islands) is preferably 90.0% or more, more preferably 95.0% or more, and still more preferably 97.0% or more. On the other hand, the above-mentioned ratio of the total number is, for example, 100.0% or less, 99.0% or less, or 98.0% or less. Preferred ranges of the above-mentioned ratio of the total number include from about 90.0 to 100.0%, from about 90.0 to 99.0%, from about 90.0 to 98.0%, from about 95.0 to 100.0%, from about 95.0 to 99.0%, from about 95.0 to 98.0%, from about 97.0 to 100.0%, from about 97.0 to 99.0%, and from about 97.0 to 98.0%.

Moreover, from the viewpoint of even more effectively preventing the above-described whitening and decrease in the insulation properties, in the cross-sectional image of the heat-sealable resin layer 4, relative to the total number of islands in the sea-island structure, the ratio of the total number of islands with an area of 0.30 µm² or more among the islands (total number of islands with an area of 0.30 µm² or more/total number of all the islands) is preferably 1.0% or less, more preferably 0.5% or less, and still more preferably 0.1% or less. On the other hand, the above-mentioned ratio of the total number is, for example, 0.0% or more.

Furthermore, from the viewpoint of even more effectively preventing the above-described whitening and decrease in the insulation properties, in the cross-sectional image of the heat-sealable resin layer 4, relative to the total number of islands in the sea-island structure, the ratio of the total number of islands with an area of 0.15 µm² or more among the islands (total number of islands with an area of 0.15 µm² or more/total number of all the islands) is preferably 1.0% or less, more preferably 0.5% or less, and still more preferably 0.1% or less. On the other hand, the above-mentioned ratio of the total number is, for example, 0.0% or more.

Furthermore, from the viewpoint of even more effectively preventing the above-described whitening and decrease in the insulation properties, in the cross-sectional image of the heat-sealable resin layer 4, the ratio of the total area of islands in the sea-island structure relative to the area of a measured range in the cross-sectional image (total area of islands/area of a measured range in the cross-sectional image) is preferably 12.0% or less, more preferably 5.0% or less, and still more preferably 1.0% or less. The above-mentioned ratio of the total area is, for example, 0.1% or more. Preferred ranges of the above-mentioned ratio of the total area include from about 0.1 to 12.0%, from about 0.1 to 5.0%, and from about 0.1 to 1.0%.

The ratio of the total area of islands with each area can be adjusted in the above-defined range of values, by adjusting the ratio of polypropylene and polyethylene contained in the heat-sealable resin layer 4 and additionally the conditions for forming the heat-sealable resin layer 4 (for example, as described below, in the case of forming the heat-sealable resin layer 4 by melt extrusion, by setting the condition for cooling the heat-sealable resin layer with a cooling roll to a rapid cooling condition (for example, setting the difference in surface temperature between the melt-extruded heat-sealable resin layer and the cooling roll to 70° C. or more), to prevent crystal growth of polyethylene in polypropylene).

With respect to the cross-sectional image of the heat-sealing resin layer 4, the method of measuring the ratio of the area of islands in the sea-island structure is as follows.

<Measurement of the Ratio of the Area of Islands and the Ratio of the Number of Islands in the Sea-Island Structure>

The power storage device packaging material is embedded in a thermosetting epoxy resin and cured. Using a commercially available rotary microtome (for example, EM UC6 from LEICA) and a glass knife, a cross section in the thickness direction y parallel to TD is prepared. Here, the cross section is prepared by room temperature microtomy. The heat-sealable resin layer of the power storage device packaging material is stained with ruthenium tetroxide together with the embedding resin for 3 hours. Because the resin expands after staining and the sea-island structure cannot be confirmed near the cross section, the expanded region is trimmed with the microtome. Then, from a cross section obtained after cutting to about 1 to 2 m, a stained slice with a thickness of about 100 nm is taken using a diamond knife, and the stained slice is observed as follows: With respect to the stained slice, a cross-sectional image is obtained using a field emission scanning electron microscope (for example, S-4800 from Hitachi High-Technologies Corporation). As described above, the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer. When, for example, S-4800 from Hitachi High-Technologies Corporation is used as the field emission scanning electron microscope, the measurement conditions are as follows: acceleration voltage: 30 kV; emission current: 10 µA; detector: transmission detector; tilt: none (0°); observation magnification: 5,000 times. Next, using image processing software that can binarize a cross-sectional image (for example, the image analysis software included with the Keyence electron microscope VHX-5000), the islands and the sea in the sea-island structure with respect to the cross-sectional image are binarized. When, for example, the image analysis software included with the Keyence electron microscope VHX-5000 is used as the image processing software, the specific procedure is as follows: The measurement is started under the brightness (standard) condition of the image analysis software, and the extraction region (measurement range) is set to a rectangular (length 7 µm, width 13 µm), the imaging size is set to the standard (1,600×1, 200), the tilt angle is set to 0 degree, the imaging mode is set to the normal imaging, and the extraction target is set to "dark region". With automatic measurement, any extraction failure portions and excess extraction sections are corrected, and the total area and the total number of the extracted sections (islands) are measured. Here, the area and the number of all the islands present in the extraction region are each measured. Using the obtained data, the ratio of the total area of all the islands relative to the area of the measured range in the cross-sectional image (total area of islands/area of the measured range in the cross-sectional image), and, among all the islands, the ratio of the total number of islands with an area of 0.01 $\mu m^2$ or less (total number of islands with an area of 0.01 $\mu m^2$ or less/total number of all the islands), the ratio of the total number of islands with an area of 0.02 $\mu m^2$ or less (total number of islands with an area of 0.02 $\mu m^2$ or less/total number of all the islands), the ratio of the total number of islands with an area of 0.03 $\mu m^2$ or less (total number of islands with an area of 0.03 $\mu m^2$ or less/total number of all the islands), the ratio of the total number of islands with an area of 0.30 $\mu m^2$ or more (total number of islands with an area of 0.30 $\mu m^2$ or more/total number of all the islands), and the ratio of the total number of islands with an area of 0.15 $\mu m^2$ or more (total number of islands with an area of 0.15 $\mu m^2$ or more/total number of all the islands) are calculated.

Examples of propylene include homopolypropylene, block copolymers of polypropylene (for example, block copolymers of propylene and ethylene, block copolymers of propylene and butene, and block copolymers of propylene, ethylene, and butene, with block copolymers of propylene and ethylene being preferred), random copolymers of polypropylene (for example, random copolymers of propylene and ethylene, random copolymers of propylene and butene, and random copolymers of propylene, ethylene and butene, with random copolymers of propylene and ethylene being preferred), and propylene-α-olefin copolymers. Examples of ethylene include low-density polyethylene, medium-density polyethylene, high-density polyethylene, linear low-density polyethylene, and ethylene-α-olefin copolymers. A single polypropylene or two or more polypropylenes may be contained in the heat-sealable resin layer 4, and a single polyethylene or two or more polyethylenes may be contained in the heat-sealable resin layer 4.

The heat-sealable resin layer 4 is preferably formed of a polypropylene resin composition containing 45% by mass or less of polyethylene. The polypropylene content in the heat-sealable resin layer 4 is adjusted such that, in the above-described cross-sectional image, relative to the total number of islands in the sea-island structure, the ratio of the total number of islands with an area of 0.02 $\mu m^2$ or less among the islands is 80.0% or more. The polyethylene content is, for example, about 45% by mass or less, preferably about 30% by mass or less, and more preferably about 20% by mass or less, whereas it is preferably about 5% by mass or more, and more preferably about 10% by mass or more. Preferred ranges include from about 5 to 45% by mass, from about 5 to 30% by mass, from about 5 to 20% by mass, from about 10 to 45% by mass, from about 10 to 30% by mass, and from about 10 to 20% by mass. The polypropylene content is, for example, 95% by mass or less or 90% by mass or less. On the other hand, the polypropylene content is, for example, 55% by mass or more, 70% by mass or more, or 80% by mass or more. Preferred ranges of the polypropylene content include from about 55 to 95% by mass, from about 70 to 95% by mass, from about 80 to 95% by mass, from about 55 to 90% by mass, from about 70 to 90% by mass, and from about 80 to 90% by mass. The mass ratio of polyethylene to polypropylene in the polypropylene resin composition is preferably about 5 to 80 parts by mass, more preferably about 5 to 45 parts by mass, still more preferably about 10 to 30 parts by mass of polyethylene, relative to 100 parts by mass of polypropylene.

The heat-sealable resin layer 4 may contain another resin in addition to polypropylene and polyethylene. Examples of the other resin include an acid-modified polyolefin.

The acid-modified polyolefin is a polymer obtained by modifying a polyolefin by block polymerization or graft polymerization with an acid component.

Specific examples of the polyolefin to be acid-modified include polyethylene, such as low-density polyethylene, medium-density polyethylene, high-density polyethylene, and linear low-density polyethylene; ethylene-α-olefin copolymers; polypropylene, such as homopolypropylene, block copolymers of polypropylene (for example, block copolymers of propylene and ethylene), and random copolymers of polypropylene (for example, random copolymers of propylene and ethylene); propylene-α-olefin copolymers; and terpolymers of ethylene-butene-propylene. Preferred among these is polypropylene. When the polyolefin resin is a copolymer, it may be a block copolymer or a random copolymer. These polyolefin-based resins may be used alone or in combination.

The acid-modified polyolefin may also be a copolymer obtained by copolymerizing the above-mentioned polyolefin with a polar molecule, such as acrylic acid or methacrylic acid, a polymer such as a crosslinked polyolefin, or the like. Examples of the acid component to be used for the acid modification include carboxylic acids or anhydrides thereof, such as maleic acid, acrylic acid, itaconic acid, crotonic acid, maleic anhydride, and itaconic anhydride.

The acid-modified polyolefin may also be an acid-modified cyclic polyolefin. The acid-modified cyclic polyolefin is a polymer obtained by replacing a portion of the monomers that forms the cyclic polyolefin with an acid component, and copolymerizing them, or by block-polymerizing or graft-polymerizing an acid component onto the cyclic polyolefin. The cyclic polyolefin to be acid-modified is the same as mentioned above. The acid component to be used for the acid modification is the same as those used for the modification of the polyolefin mentioned above.

Examples of preferred acid-modified polyolefins include polyolefins modified with carboxylic acids or anhydrides thereof, polypropylene modified with carboxylic acids or anhydrides thereof, maleic anhydride-modified polyolefins, and maleic anhydride-modified polypropylene.

The heat-sealable resin layer 4 may be formed of only one layer, or may be formed of two or more layers with the same resin component or different resin components.

The heat-sealable resin layer 4 may optionally contain a lubricant or the like. The inclusion of a lubricant in the heat-sealable resin layer 4 can improve the moldability of the power storage device packaging material. The lubricant is not limited, and may be any of known lubricants. Such lubricants may be used alone or in combination.

While the lubricant is not limited, it is preferably an amide-based lubricant. Specific examples of lubricants are those as mentioned for the base material layer 1. Such lubricants may be used alone or in combination.

When a lubricant is present on the surface of the heat-sealable resin layer 4, the amount of the lubricant present is not limited; however, from the viewpoint of improving the moldability of the power storage device packaging material, it is preferably about 10 to 50 $mg/m^2$, and more preferably about 15 to 40 $mg/m^2$.

The lubricant present on the surface of the heat-sealable resin layer 4 may be exuded from the lubricant contained in the resin that forms the heat-sealable resin layer 4, or may be applied to the surface of the heat-sealable resin layer 4.

The thickness of the heat-sealable resin layer 4 is not limited as long as the heat-sealable resin layer 4 is heat-sealed with the other heat-sealable resin layer 4 to exhibit the function of hermetically sealing the power storage device element; for example, it is about 100 µm or less, preferably about 85 µm or less, and more preferably about 15 to 85 µm. For example, when the thickness of the below-described adhesive layer 5 is 10 µm or more, the thickness of heat-sealable resin layer 4 is preferably about 85 µm or less, and more preferably about 15 to 45 µm. For example, when the thickness of the below-described adhesive layer 5 is less than 10 µm or when the adhesive layer 5 is not provided, the thickness of the heat-sealable resin layer 4 is preferably about 20 µm or more, and more preferably about 35 to 85 µm.

The heat-sealable resin layer 4 is preferably formed by melt extrusion. When the below-described adhesive layer 5 is also provided, the adhesive layer 5 and the heat-sealable resin layer 4 are preferably formed by melt co-extrusion. In the present disclosure, it is preferred to set the condition for cooling the molten resin that forms the heat-sealable resin layer 4 to a rapid cooling condition to prevent crystal growth of polyethylene in polypropylene, so that, in the above-described cross-sectional image, relative to the total number of islands in the sea-island structure, the ratio of the total number of islands with an area of 0.02 µm$^2$ or less among the islands can be adjusted to 80.0% or more. For example, as described above, the ratio of polypropylene and polyethylene contained in the heat-sealable resin layer 4 is appropriately adjusted and simultaneously, the condition for cooling the molten resin (molten resin that forms the heat-sealable resin layer) with a cooling roll (a roll that transfers and simultaneously cools a sheet formed from the molten resin) is set to a rapid cooling condition (for example, the difference in surface temperature between the melt-extruded heat-sealable resin layer and the cooling roll is set to 70° C. or more) during the formation of the heat-sealable resin layer 4 by melt extrusion or like, to prevent crystal growth of polyethylene in polypropylene, so that, in the above-described cross-sectional image, relative to the total number of islands in the sea-island structure, the ratio of the total number of islands with an area of 0.02 µm$^2$ or less among the islands can be adjusted to 80.0% or more. When the adhesive layer 5 and the heat-sealable resin layer 4 are formed by melt co-extrusion, the thickness of the adhesive layer 5 is preferably 15 to 45 µm, and the thickness of the heat-sealable resin layer 4 is preferably 15 to 45 µm.

[Adhesive Layer 5]

In the power storage device packaging material of the present disclosure, the adhesive layer 5 is a layer that is optionally provided between the barrier layer 3 (or an acid resistance film) and the heat-sealable resin layer 4, in order to strongly bond these layers.

The adhesive layer 5 is formed of a resin capable of bonding the barrier layer 3 and the heat-sealable resin layer 4. The resin to be used for forming the adhesive layer 5 may be the same as the adhesive mentioned for the adhesive agent layer 2, for example. The resin used for forming the adhesive layer 5 preferably contains a polyolefin backbone, and examples of the resin include the polyolefin and the acid-modified polyolefin mentioned above for the heat-sealable resin layer 4. The inclusion of a polyolefin backbone in the resin that forms the adhesive layer 5 can be analyzed by, for example, infrared spectroscopy or gas chromatography-mass spectrometry, although the analytical method is not limited. When the resin that forms the adhesive layer 5 is analyzed by infrared spectroscopy, peaks derived from maleic anhydride are preferably detected. For example, when a maleic anhydride-modified polyolefin is measured by infrared spectroscopy, peaks derived from maleic anhydride are detected at a wavelength near 1760 cm$^{-1}$ and a wavelength near 1780 cm$^{-1}$. However, if the degree of acid modification is low, the peaks may be so small that they cannot be detected. In that case, the analysis can be performed by nuclear magnetic resonance spectroscopy.

From the viewpoint of strongly bonding the barrier layer 3 and the heat-sealable resin layer 4, the adhesive layer 5 preferably contains an acid-modified polyolefin. The acid-modified polyolefin is particularly preferably a polyolefin modified with a carboxylic acid or an anhydride thereof, polypropylene modified with a carboxylic acid or an anhydride thereof, a maleic anhydride-modified polyolefin, or maleic anhydride-modified polypropylene.

Furthermore, from the viewpoint of providing the power storage device packaging material with excellent shape stability after molding, while reducing the thickness of the power storage device packaging material, the adhesive layer 5 is more preferably a cured product of a resin composition containing an acid-modified polyolefin and a curing agent. Preferred examples of the acid-modified polyolefin include those mentioned above.

The adhesive layer 5 is preferably a cured product of a resin composition containing an acid-modified polyolefin, and at least one selected from the group consisting of a compound with an isocyanate group, a compound with an oxazoline group, and a compound with an epoxy group, and is particularly preferably a cured product of a resin composition containing an acid-modified polyolefin, and at least one selected from the group consisting of a compound with an isocyanate group and a compound with an epoxy group. The adhesive layer 5 preferably contains at least one selected from the group consisting of a polyurethane, a polyester, and an epoxy resin, and more preferably contains a polyurethane and an epoxy resin. The polyester is preferably an amide ester resin, for example. The amide ester resin is typically produced by reacting a carboxyl group and an oxazoline group. The adhesive layer 5 is more preferably a cured product of a resin composition containing at least one of these resins and the above-mentioned acid-modified polyolefin. When unreacted matter of the curing agent such as the compound with an isocyanate group, the compound with an oxazoline group, or the compound with an epoxy group remains in the adhesive layer 5, the presence of the unreacted matter can be confirmed using a method selected from, for example, infrared spectroscopy, Raman spectroscopy, and time-of-flight secondary ion mass spectrometry (TOF-SIMS).

Moreover, from the viewpoint of further improving the adhesion between the barrier layer 3 and the adhesive layer 5, the adhesive layer 5 is preferably a cured product of a resin composition containing a curing agent with at least one selected from the group consisting of an oxygen atom, a heterocyclic ring, a C=N bond, and a C—O—C bond. Examples of the curing agent with a heterocyclic ring include a curing agent with an oxazoline group and a curing agent with an epoxy group. Examples of the curing agent with a C=N bond include a curing agent with an oxazoline group and a curing agent with an isocyanate group. Examples of the curing agent with a C—O—C bond include a curing agent with an oxazoline group, a curing agent with an epoxy group, and a polyurethane. The fact that the adhesive layer 5 is a cured product of a resin composition containing the above-described curing agent can be confirmed using a method such as, for example, gas chromatography-mass spectrometry (GCMS), infrared spectroscopy (IR), time-of-flight secondary ion mass spectrometry (TOF-SIMS), or X-ray photoelectron spectroscopy (XPS).

While the compound with an isocyanate group is not limited, it is preferably a polyfunctional isocyanate compound, from the viewpoint of effectively improving the adhesion between the barrier layer 3 and the adhesive layer 5. The polyfunctional isocyanate compound is not limited as long as it is a compound with two or more isocyanate groups. Specific examples of polyfunctional isocyanate-based curing agents include pentane diisocyanate (PDI), isophorone diisocyanate (IPDI), hexamethylene diisocyanate (HDI), tolylene diisocyanate (TDI), diphenylmethane diisocyanate (MDI), polymer or isocyanurate forms thereof, mixtures thereof, and copolymers thereof with other polymers. Examples also include adducts, biurets, isocyanurates, and other forms thereof.

The content of the compound with an isocyanate group in the adhesive layer 5 is preferably in the range of 0.1 to 50% by mass, and more preferably in the range of 0.5 to 40% by mass, in the resin composition that forms the adhesive layer 5. This can effectively improve the adhesion between the barrier layer 3 and the adhesive layer 5.

The compound with an oxazoline group is not limited as long as it is a compound with an oxazoline backbone. Specific examples of the compound with an oxazoline group include those having a polystyrene main chain and those having an acrylic main chain. Examples of commercial products include the Epocros series from Nippon Shokubai Co., Ltd.

The content of the compound with an oxazoline group in the adhesive layer 5 is preferably in the range of 0.1 to 50% by mass, and more preferably in the range of 0.5 to 40% by mass, in the resin composition that forms the adhesive layer 5. This can effectively improve the adhesion between the barrier layer 3 and the adhesive layer 5.

Examples of the compound with an epoxy group include an epoxy resin. The epoxy resin is not limited as long as it is a resin capable of forming a crosslinked structure with epoxy groups present in the molecule, and may be any of known epoxy resins. The weight average molecular weight of the epoxy resin is preferably about 50 to 2,000, more preferably about 100 to 1,000, and still more preferably about 200 to 800. In a first aspect of the disclosure, the weight average molecular weight of the epoxy resin is the value measured by gel permeation chromatography (GPC), using polystyrene as standard samples.

Specific examples of the epoxy resin include glycidyl ether derivative of trimethylolpropane, bisphenol A diglycidyl ether, modified bisphenol A diglycidyl ether, novolac glycidyl ether, glycerol polyglycidyl ether, and polyglycerol polyglycidyl ether. These epoxy resins may be used alone or in combination.

The content of the epoxy resin in the adhesive layer 5 is preferably in the range of 0.1 to 50% by mass, and more preferably in the range of 0.5 to 40% by mass, in the resin composition that forms the adhesive layer 5. This can effectively improve the adhesion between the barrier layer 3 and the adhesive layer 5.

The polyurethane is not limited, and may be any of known polyurethanes. The adhesive layer 5 may be, for example, a cured product of a two-liquid curable polyurethane.

The content of the polyurethane in the adhesive layer 5 is preferably in the range of 0.1 to 50% by mass, and more preferably in the range of 0.5 to 40% by mass, in the resin composition that forms the adhesive layer 5. This can effectively improve the adhesion between the barrier layer 3 and the adhesive layer 5, in an atmosphere containing a component that induces corrosion of the barrier layer, for example, an electrolytic solution.

When the adhesive layer 5 is a cured product of a resin composition containing at least one selected from the group consisting of a compound with an isocyanate group, a compound with an oxazoline group, and an epoxy resin, and the above-mentioned acid-modified polyolefin, the acid-modified polyolefin functions as a base resin, and each of the compound with an isocyanate group, the compound with an oxazoline group, and the compound with an epoxy group functions as a curing agent.

The thickness of the adhesive layer 5 is preferably about 50 µm or less, about 45 µm or less, about 30 µm or less, about 20 µm or less, or about 5 µm or less. On the other hand, the thickness of the adhesive layer 5 is preferably about 0.1 µm or more, about 0.5 µm or more, about 5 µm or more, about 10 µm or more, or about 15 µm or more. Preferred ranges of the thickness include from about 0.1 to 50 µm, from about 0.1 to 45 µm, from about 0.1 to 30 µm, from about 0.1 to 20 µm, from about 0.1 to 5 µm, from about 0.5 to 50 µm, from about 0.5 to 45 µm, from about 0.5 to 30 µm, from about 0.5 to 20 µm, from about 0.5 to 5 µm, from about 5 to 50 µm, from about 5 to 45 µm, from about 5 to 30 µm, from about 5 to 20 µm, from about 10 to 50 µm, from about 10 to 45 µm, from about 10 to 30 µm, from about 10 to 20 µm, from about 15 to 50 µm, from about 15 to 45 µm, from about 15 to 30 µm, and from about 15 to 20 µm.

More specifically, particularly when the adhesive layer 5 is an adhesive as mentioned for the adhesive agent layer 2 or a cured product of an acid-modified polyolefin and a curing agent, the thickness of the adhesive layer 5 is preferably about 1 to 10 µm, and more preferably about 1 to 5 µm. In particular, when a resin (such as an acid-modified polyolefin) as mentioned for the heat-sealable resin layer 4 is used, the thickness of the adhesive layer 5 is preferably about 5 to 50 µm, about 5 to 45 µm, about 10 to 50 µm, about 10 to 45 µm, about 15 to 50 µm, or about 15 to 45 µm. When the adhesive layer 5 is an adhesive as mentioned for the adhesive agent layer 2 or a cured product of a resin composition containing an acid-modified polyolefin and a curing agent, the adhesive layer 5 can be formed by, for example, applying the resin composition, and curing by heating or the like. Alternatively, when a resin as mentioned for the heat-sealable resin layer 4 is used, the adhesive layer 5 can be favorably formed by, for example, melt co-extrusion of the heat-sealable resin layer 4 and the adhesive layer 5.

[Surface Coating Layer 6]

The power storage device packaging material of the present disclosure may optionally include a surface coating layer 6 on the base material layer 1 (opposite to the barrier layer 3 on the base material layer 1), for at least one of the purposes of improving the designability, electrolytic solution resistance, scratch resistance, and moldability, for example. The surface coating layer 6 is a layer positioned as the outermost layer of the power storage device packaging material, upon assembly of a power storage device using the power storage device packaging material.

The surface coating layer 6 can be formed using a resin such as, for example, polyvinylidene chloride, a polyester, a polyurethane, an acrylic resin, or an epoxy resin.

When the resin that forms the surface coating layer 6 is a curable resin, the resin may be either a one-liquid curable resin or a two-liquid curable resin, preferably a two-liquid curable resin. Examples of two-liquid curable resins include a two-liquid curable polyurethane, a two-liquid curable polyester, and a two-liquid curable epoxy resin. Preferred among these is the two-liquid curable polyurethane.

The two-liquid curable polyurethane may be, for example, a polyurethane containing a base resin that contains a polyol compound and a curing agent that contains an isocyanate compound. The two-liquid curable polyurethane is preferably a two-liquid curable polyurethane containing a polyol, such as a polyester polyol, a polyether polyol, or an acrylic polyol as a base resin, and containing an aromatic or aliphatic polyisocyanate as a curing agent. The polyol compound is preferably a polyester polyol having a hydroxy group at a side chain, in addition to the hydroxy groups at the ends of the repeating unit. When the surface coating layer 6 is formed of a polyurethane, the power storage device packaging material is provided with excellent electrolytic solution resistance.

At least one of the surface and the inside of the surface coating layer 6 may optionally contain the above-described lubricants, and additives, such as anti-blocking agents, matting agents, flame retardants, antioxidants, tackifiers, and anti-static agents, depending on the functionality and the like to be imparted to the surface coating layer 6 and the surface thereof. Examples of the additives include fine particles with an average particle diameter of about 0.5 nm to 5 μm. The average particle diameter of the additives is the median diameter measured using a laser diffraction/scattering particle size distribution analyzer.

The additives may be either inorganic or organic. The additives are also not limited in shape, and may be spherical, fibrous, plate-like, amorphous, or flake-like, for example.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acrylic, crosslinked styrene, crosslinked polyethylene, benzoguanamine, gold, aluminum, copper, and nickel. These additives may be used alone or in combination. Among these additives, silica, barium sulfate, and titanium oxide are preferred from the viewpoint of dispersion stability, costs, and the like. Surfaces of the additives may be subjected to various surface treatments, such as insulation treatment and dispersibility enhancing treatment.

Examples of methods of forming the surface coating layer 6 include, but are not limited to, applying the resin that forms the surface coating layer 6. When an additive is to be used in the surface coating layer 6, the resin blended with the additive may be applied.

The thickness of the surface coating layer 6 is not limited as long as it exhibits the above-described function as the surface coating layer 6; for example, it is about 0.5 to 10 μm, and preferably about 1 to 5 μm.

3. Method for Producing a Power Storage Device Packaging Material

The method for producing a power storage device packaging material is not limited as long as it produces a laminate including the layers of the power storage device packaging material of the present invention. Examples of the method include a method comprising the step of laminating at least the base material layer 1, the barrier layer 3, and the heat-sealable resin layer 4 in this order from an outer side toward an inner side. Specifically, the method for producing a power storage device packaging material comprises the step of obtaining a laminate by laminating at least a base material layer, a barrier layer, and a heat-sealable resin layer in this order, wherein the heat-sealable resin layer contains polypropylene and polyethylene; with respect to a cross section of the heat-sealable resin layer in a thickness direction y parallel to TD, a sea-island structure is observed in a cross-sectional image obtained with a scanning electron microscope; and in the cross-sectional image, relative to the total number of islands in the sea-island structure, the ratio of the total number of islands with an area of 0.02 $\mu m^2$ or less among the islands is 80.0% or more.

One example of the method for producing a power storage device packaging material of the present invention is as follows: Initially, a laminate including the base material layer 1, the adhesive agent layer 2, and the barrier layer 3 in this order (the laminate may be hereinafter denoted as the "laminate A") is formed. Specifically, the laminate A can be formed using a dry lamination method as follows: The adhesive to be used for forming the adhesive agent layer 2 is applied to the base material layer 1 or to the barrier layer 3 with surface(s) optionally subjected to chemical conversion treatment, using a coating method such as a gravure coating method or a roll coating method, and dried. Then, the barrier layer 3 or the base material layer 1 is laminated thereon, and the adhesive agent layer 2 is cured.

Subsequently, the heat-sealable resin layer 4 is laminated on the barrier layer 3 of the laminate A. When the heat-sealable resin layer 4 is to be laminated directly on the barrier layer 3, the heat-sealable resin layer 4 may be laminated onto the barrier layer 3 of the laminate A, using a method such as a thermal lamination method or an extrusion lamination method. When the adhesive layer 5 is to be provided between the barrier layer 3 and the heat-sealable resin layer 4, exemplary methods include the following: (1) a method in which the adhesive layer 5 and the heat-sealable resin layer 4 are extruded to be laminated on the barrier layer 3 of the laminate A (co-extrusion lamination or tandem lamination method); (2) a method in which a laminate in which the adhesive layer 5 and the heat-sealable resin layer 4 are laminated is separately formed, and this laminate is laminated on the barrier layer 3 of the laminate A using a thermal lamination method, or a method in which a laminate in which the adhesive layer 5 is laminated on the barrier layer 3 of the laminate A is formed, and this laminate is laminated to the heat-sealable resin layer 4 using a thermal lamination method; (3) a method in which the adhesive layer 5 that has been melted is poured between the barrier layer 3 of the laminate A and the heat-sealable resin layer 4 pre-formed into a sheet, and simultaneously the laminate A and the heat-sealable resin layer 4 are bonded with the adhesive layer 5 interposed therebetween (sandwich lamination method); and (4) a method in which the adhesive for forming the adhesive layer 5 is laminated on the barrier layer 3 of the laminate A by, for example, applying the adhesive onto the barrier layer 3 using solution coating, and drying, and optionally further baking, and then the heat-sealable resin layer 4 pre-formed into a sheet is laminated on the adhesive layer 5.

When the surface coating layer 6 is to be provided, the surface coating layer 6 is laminated on the surface of the base material layer 1 opposite to the barrier layer 3. The surface coating layer 6 can be formed by, for example, applying the above-mentioned resin that forms the surface coating layer 6 onto the surface of the base material layer 1. The order of the step of laminating the barrier layer 3 on the surface of the base material layer 1 and the step of laminating the surface coating layer 6 on the surface of the base material layer 1 is not limited. For example, the surface coating layer 6 may be formed on the surface of the base material layer 1, and then the barrier layer 3 may be formed on the surface of the base material layer 1 opposite to the surface coating layer 6.

In the manner as described above, a laminate including the optional surface coating layer 6/the base material layer 1/the optional adhesive agent layer 2/the barrier layer 3/the optional adhesive layer 5/the heat-sealable resin layer 4 in this order is formed. The laminate may optionally be further subjected to heat treatment, in order to strengthen the adhesiveness of the optional adhesive agent layer 2 and the optional adhesive layer 5.

In the power storage device packaging material, each layer that forms the laminate may be optionally subjected to a surface activation treatment, such as corona treatment, blast treatment, oxidation treatment, or ozone treatment, to thereby improve the processability. For example, ink printability on the surface of the base material layer 1 can be improved by corona-treating the surface of the base material layer 1 opposite to the barrier layer 3.

4. Uses of the Power Storage Device Packaging Material

The power storage device packaging material of the present disclosure is used as a package for hermetically sealing and housing a power storage device element including a positive electrode, a negative electrode, and an electrolyte. That is, a power storage device can be provided by housing a power storage device element comprising at least a positive electrode, a negative electrode, and an electrolyte in a package formed of the power storage device packaging material of the present disclosure.

Specifically, a power storage device element comprising at least a positive electrode, a negative electrode, and an electrolyte is covered with the power storage device packaging material of the present disclosure such that a flange portion (region where the heat-sealable resin layer is contacted with the other heat-sealable resin layer) can be formed on the periphery of the power storage device element, with the metal terminal connected to each of the positive electrode and the negative electrode protruding to the outside. Then, the heat-sealable resin layers in the flange portion are heat-sealed to hermetically seal the power storage device element. As a result, a power storage device is provided using the power storage device packaging material. When the power storage device element is housed in the package formed of the power storage device packaging material of the present disclosure, the package is formed such that the heat-sealable resin layer region of the power storage device packaging material of the present disclosure is positioned on the inner side (surface in contact with the power storage device element).

The power storage device packaging material of the present disclosure is suitable for use in power storage devices, such as batteries (including condensers and capacitors). The power storage device packaging material of the present disclosure may be used for either primary batteries or secondary batteries, preferably secondary batteries. While the type of secondary batteries to which the power storage device packaging material of the present disclosure is applied is not limited, examples include lithium ion batteries, lithium ion polymer batteries, all-solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the power storage device packaging material of the present disclosure is applied include lithium ion batteries and lithium ion polymer batteries.

EXAMPLES

The present disclosure will be hereinafter described in detail with reference to examples and comparative examples; however, the present disclosure is not limited to the examples.

<Production of Power Storage Device Packaging Materials>

Examples 1 and 2, and Comparative Examples 1 and 2

A polyethylene terephthalate (PET) film (thickness: 12 μm) and a stretched nylon (ONy) film (thickness: 15 μm) were prepared, and a two-liquid urethane adhesive (a polyol compound and an aromatic isocyanate-based compound) was applied (3 μm) to the PET film and then bonded to the ONy film to form a base material layer. As a barrier layer, an aluminum alloy foil (JIS H4160: 1994 A8021H-O (thickness: 40 μm)) was prepared. Next, a two-liquid urethane adhesive (a polyol compound and an aromatic isocyanate-based compound) was applied to one surface of the aluminum alloy foil to form an adhesive agent layer (thickness: 3 μm) on the barrier layer. Subsequently, the adhesive agent layer on the barrier layer and the base material layer (ONy film side) were laminated together using a dry lamination method, and then subjected to aging treatment to prepare a laminate having the base material layer/the adhesive agent layer/the barrier layer. Both surfaces of the aluminum alloy foil were previously subjected to chemical conversion treatment. The chemical conversion treatment of the aluminum alloy foil was performed by applying a treatment solution containing a phenol resin, a chromium fluoride compound, and phosphoric acid to both surfaces of the aluminum alloy foil, using a roll coating method, such that the amount of chromium applied was 10 mg/m$^2$ (dry mass), followed by baking.

Next, maleic anhydride-modified polypropylene as an adhesive layer (thickness: 40 μm) and random polypropylene (composition of random polypropylene and polyethylene) as a heat-sealable resin layer (thickness: 40 μm) were melt co-extruded onto the barrier layer of each laminate obtained above, and then the heat-sealable resin layer side was contacted with a cooling roll and cooled (each under the below-described cooling condition A or B), so that the adhesive layer/the heat-sealable resin layer were laminated on the barrier layer. This produced a power storage device packaging material (entire thickness: 153 μm) including the base material layer (thickness including the adhesive: 30 μm)/adhesive agent layer (3 μm)/barrier layer (40 μm)/adhesive layer (40 μm)/heat-sealable resin layer (40 μm) laminated in this order. In Example 2, the polyethylene content in the heat-sealable resin layer was lower than that in Example 1. In Comparative Example 1, the polyethylene content in the heat-sealable resin layer was higher than that in Example 1. In Comparative Example 2, the composition of the heat-sealable resin layer was the same as that in Example 1, but the cooling condition B was employed.

(Cooling Condition)

The condition under which the heat-sealable resin layer side was contacted with a cooling roll and cooled is as set forth below. The cooling conditions employed in the examples and comparative examples are shown in Table 1.

Cooling condition A: With the difference between the temperature of the melt co-extruded molten resin (molten resin that forms the heat-sealable resin layer) and the surface temperature of the cooling roll set at 70° C. or more, the molten resin was rapidly cooled to form the heat-sealable resin layer (condition that prevents crystal growth of polyethylene).

Cooling condition B: With the difference between the temperature of the melt co-extruded molten resin (molten resin that forms the heat-sealable resin layer) and the surface temperature of the cooling roll set at 50° C. or less, the molten resin was slowly cooled to form the heat-sealable resin layer.

<Measurement of the Ratio of the Area of Islands and the Ratio of the Number of Islands in the Sea-Island Structure>

The power storage device packaging material was embedded in a thermosetting epoxy resin and cured. Using a commercially available rotary microtome (EM UC6 from LEICA) and a glass knife, a cross section in the thickness direction parallel to TD was prepared. Here, the cross section was prepared by room temperature microtomy. The heat-sealable resin layer of the power storage device packaging material was stained with ruthenium tetroxide together with the embedding resin for 3 hours. Because the resin expands after staining and the sea-island structure cannot be confirmed near the cross section, the expanded region was trimmed with the microtome. Then, from a cross section obtained after cutting to about 1 to 2 µm, a stained slice with a thickness of about 100 nm was taken using a diamond knife, and the stained slice was observed as follows: With respect to the stained slice, a cross-sectional image was obtained using a field emission scanning electron microscope (S-4800 from Hitachi High-Technologies Corporation). The cross-sectional image was such that when the total thickness of the layers positioned closer to the inner side than the barrier layer was taken as 100%, the cross-sectional image was obtained within a range of thicknesses of up to 12.5% from the surface opposite to the barrier layer side of the heat-sealable resin layer. The measurement conditions were as follows: acceleration voltage: 30 kV; emission current: 10 µA; detector: transmission detector; tilt: none (0°); observation magnification: 5,000 times. Next, using image processing software that can binarize a cross-sectional image (the image analysis software included with the Keyence electron microscope VHX-5000), the islands and the sea in the sea-island structure with respect to the cross-sectional image were binarized. The specific procedure was as follows: The measurement was started under the brightness (standard) condition of the image analysis software, and the extraction region (measurement range) was set to a rectangular (length 7 µm, width 13 µm), the imaging size was set to the standard (1,600×1,200), the tilt angle was set to 0 degree, the imaging mode was set to the normal imaging, and the extraction target was set to "dark region". With automatic measurement, any extraction failure portions and excess extraction sections were corrected, and the total area and the total number of the extracted sections (islands) were measured. Here, the area and the number of all the islands present in the extraction region were each measured. Using the obtained data, the ratio of the total area of all the islands relative to the area of the measured range in the cross-sectional image (total area of islands/area of the measured range in the cross-sectional image), and, among all the islands, the ratio of the total number of islands with an area of 0.01 µm$^2$ or less (total number of islands with an area of 0.01 µm$^2$ or less/total number of all the islands), the ratio of the total number of islands with an area of 0.02 µm$^2$ or less (total number of islands with an area of 0.02 µm$^2$ or less/total number of all the islands), the ratio of the total number of islands with an area of 0.03 µm$^2$ or less (total number of islands with an area of 0.03 µm$^2$ or less/total number of all the islands), the ratio of the total number of islands with an area of 0.30 µm$^2$ or more (total number of islands with an area of 0.30 µm$^2$ or more/total number of all the islands), and the ratio of the total number of islands with an area of 0.15 µm$^2$ or more (total number of islands with an area of 0.15 µm$^2$ or more/total number of all the islands) were calculated. Each of the results is shown in Table 1.

<Whitening Due to Molding>

Each power storage device packaging material was cut to a rectangle with a length (MD: Machine Direction) of 90 mm and a width (TD) of 150 mm to prepare a test sample. MD of the power storage device packaging material corresponds to the rolling direction (RD) of the aluminum alloy foil, and TD of the power storage device packaging material corresponds to TD of the aluminum alloy foil. Under an environment at 25° C., this test sample was cold-molded (draw-in one-step molding) at a pressing pressure (surface pressure) of 0.1 MPa to give a molding depth of 6.0 mm, using a rectangular molding die with an opening size of 31.6 mm (MD)×54.5 mm (TD) (female die; the surface had a maximum height of roughness profile (nominal value of Rz) of 3.2 µm, as specified in Table 2 of JIS B 0659-1: 2002 Appendix 1 (Referential) Surface Roughness Standard Specimens for Comparison; corner R: 2.0; ridge R: 1.0 mm) and a corresponding molding die (male die; the surface of the ridge had a maximum height of roughness profile (nominal value of Rz) of 1.6 µm, as specified in Table 2 of JIS B 0659-1: 2002 Appendix 1 (Referential) Surface Roughness Standard Specimens for Comparison; and the surface of the region other than the ridge had a maximum height of roughness profile (nominal value of Rz) of 3.2 µm, as specified in Table 2 of JIS B 0659-1: 2002 Appendix 1 (Referential) Surface Roughness Standard Specimens for Comparison; corner R: 2.0; ridge R: 1.0 mm). Here, molding was performed with the above-described test sample being placed on the female die such that the heat-sealable resin layer side was positioned on the male die side. The clearance between the male die and the female die was 0.3 mm. The heat-sealable resin layer of the molded test sample was visually observed to check for the presence of whitening. A test sample without whitening was evaluated as A; a test sample with slight whitening was evaluated as B; and a test sample with evident whitening was evaluated as C. The results are shown in Table 1. It should be noted that whitening typically occurs around the side walls on the short sides of the molded portion.

<Insulation Properties>

Each power storage device packaging material was cut to a sheet piece with a length (MD) of 160 mm and a width (TD) of 90 mm. Next, under an environment at 25° C., the sheet piece was cold-molded (draw-in one-step molding) at a pressing pressure (surface pressure) of 0.1 MPa to give a molding depth of 3.0 mm, using a rectangular molding die with an opening size of 31.6 mm (MD)×54.5 mm (TD) (female die; the surface had a maximum height of roughness profile (nominal value of Rz) of 3.2 µm, as specified in Table 2 of JIS B 0659-1: 2002 Appendix 1 (Referential) Surface Roughness Standard Specimens for Comparison; corner R: 2.0; ridge R: 1.0 mm) and a corresponding molding die (male die; the surface of the ridge had a maximum height of roughness profile (nominal value of Rz) of 1.6 µm, as specified in Table 2 of JIS B 0659-1: 2002 Appendix 1 (Referential) Surface Roughness Standard Specimens for Comparison; and the surface of the region other than the ridge had a maximum height of roughness profile (nominal value of Rz) of 3.2 µm, as specified in Table 2 of JIS B 0659-1: 2002 Appendix 1 (Referential) Surface Roughness Standard Specimens for Comparison; corner R: 2.0; ridge R: 1.0 mm). Next, the molded sample piece was folded in half in the MD direction so that the heat-sealable resin layer was opposed to the other heat-sealable resin layer, and the sample piece was cut so that the width of the MD-side ends from the molded portion was 3 mm, to obtain a molded article. The position of the molded portion was such that the distance between the molded portion and each of both end sides along TD of the sheet piece was 25 or 32 mm.

Next, a polyethylene terephthalate plate (PET plate) with a thickness of 3.0 mm, a length (MD) of 30.0 mm, and a width (TD) of 52.5 mm and an aluminum terminal with a thickness of 70 µm, a length (MD) of 55 mm, and a width (TD) of 5 mm were prepared. A tab film (formed of maleic anhydride-modified polypropylene) with a thickness of 100 µm and a width of 10 mm was wrapped around the central region of the aluminum terminal. The aluminum terminal was attached with paper tape to an end along MD of the PET plate, and the PET plate was inserted into the molded portion of the above-described molded article. Here, the aluminum terminal protruded from the molded portion to the outside of the molded article, and the tab film was positioned between the heat-sealable resin layers of the molded article. In this state, the end side of the molded article with the protruding aluminum terminal was heat-sealed under the following conditions: a width of 3 mm, a surface pressure of 4.0 MPa, a sealing temperature of 170° C., and a sealing time of 3.0 seconds. Next, one end side orthogonal to the heat-sealed end side was heat-sealed under the following conditions: a width of 3 mm, a surface pressure of 1.0 MPa, a sealing temperature of 170° C., and a sealing time of 3.0 seconds, to make the molded article bag-shaped. Next, the bag-shaped molded article was stored in a dry room for 1 day. An electrolytic solution (obtained by mixing a solution mixture of ethylene carbonate, diethyl carbonate, and dimethyl carbonate at a volume ratio of 1:1:1 with lithium hexafluorophosphate at a concentration of 1 mol/L) was injected through the remaining one open end side (opening), and the opening was heat-sealed under the following conditions: a width of 3 mm, a surface pressure of 1.0 MPa, a sealing temperature of 170° C., and a sealing time of 3.0 seconds, to hermetically seal the electrolytic solution in the molded article. The molded article was stored under an environment at 60° C. for 6 hours with the lastly heat-sealed end side facing up. Next, the heat-sealable resin layers between the lastly heat-sealed end side and the molded portion were heat-sealed along the molded portion, under the following conditions: a width of 3 mm, a surface pressure of 1.0 MPa, a sealing temperature of 170° C., and a sealing time of 3.0 seconds, to obtain a test sample having the electrolytic solution hermetically sealed in the molded portion.

Next, test samples as obtained above were evaluated for insulation properties between the aluminum terminal and the barrier layer of the test sample, using a tester (insulation resistance tester 3154; Hioki E.E. Corporation). Initially, 10 test samples for each example were prepared. Next, one terminal of the tester was connected to the aluminum terminal of the test sample, while the other terminal of the tester was connected with an alligator clip to be in contact with the barrier layer of the power storage device packaging material. Next, a voltage of 25 V was applied across the tester. A sample having a resistance of 200 MΩ or more after 10 seconds was evaluated as acceptable (OK), and a sample having a resistance of less than 200 MΩ after 10 seconds was evaluated as unacceptable (NG). The number of unacceptable (NG) test samples out of the 10 test samples is shown in Table 1.

TABLE 1

| | Heat-sealable resin layer | | | | | | | |
|---|---|---|---|---|---|---|---|---|
| Total ratio (%) of the area of islands in the sea-island structure | Ratio (%) of the total number of islands with an area of 0.01 µm² or less relative to the total number of islands | Ratio (%) of the total number of islands with an area of 0.02 µm² or less relative to the total number of islands | Ratio (%) of the total number of islands with an area of 0.03 µm² or less relative to the total number of islands | Ratio (%) of the total number of islands with an area of 0.15 µm² or more relative to the total number of islands | Ratio (%) of the total number of islands with an area of 0.30 µm² or more relative to the total number of islands | Cooling condition | Whitening due to molding | Insulation properties (Number of NG samples out of 10) |
| 11.1 | 56.2 | 84.3 | 93.0 | 0.1 | 0.1 | A | B | 0/10 |
| 0.6 | 63.6 | 96.1 | 97.4 | 0.0 | 0.0 | A | A | 0/10 |
| 14.0 | 21.8 | 40.6 | 56.3 | 5.1 | 1.4 | A | C | 6/10 |
| 10.0 | 4.0 | 30.2 | 40.9 | 14.8 | 2.7 | B | C | 4/10 |

"PE" in Table 1 refers to polyethylene.

As is clear from Table 1, in the power storage device packaging materials of Examples 1 and 2, in the cross-sectional image of the heat-sealable resin layer containing polypropylene and polyethylene, relative to the total number of islands in the sea-island structure, the ratio of the total number of islands with an area of 0.02 µm² or less among the islands was 80.0% or more, and thus, whitening and a decrease in the insulation properties due to molding were effectively prevented.

As described above, the present disclosure provides the embodiments of the invention as itemized below:

Item 1. A power storage device packaging material comprising a laminate comprising at least a base material layer, a barrier layer, and a heat-sealable resin layer in this order from an outer side toward an inner side, wherein
the heat-sealable resin layer contains polypropylene and polyethylene,
with respect to a cross section of the heat-sealable resin layer in a thickness direction parallel to TD, a sea-island structure is observed in a cross-sectional image obtained with a scanning electron microscope,
the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer, and
in the cross-sectional image, relative to the total number of islands in the sea-island structure, the ratio of the total number of islands with an area of 0.02 μm² or less among the islands is 80.0% or more.

Item 2. The power storage device packaging material according to item 1, wherein in the cross-sectional image of the heat-sealable resin layer, the ratio of the total area of islands in the sea-island structure relative to the area of a measured range in the cross-sectional image is 12.0% or less.

Item 3. The power storage device packaging material according to item 1 or 2, wherein in the cross-sectional image of the heat-sealable resin layer, relative to the total number of islands in the sea-island structure, the ratio of the total number of islands with an area of 0.03 μm² or less among the islands is 90.0% or more.

Item 4. The power storage device packaging material according to any one of items 1 to 3, wherein in the cross-sectional image of the heat-sealable resin layer, relative to the total number of islands in the sea-island structure, the ratio of the total number of islands with an area of 0.01 μm² or less among the islands is 50.0% or more.

Item 5. The power storage device packaging material according to any one of items 1 to 4, wherein in the cross-sectional image of the heat-sealable resin layer, relative to the total number of islands in the sea-island structure, the ratio of the total number of islands with an area of 0.30 μm² or more among the islands is 1.0% or less.

Item 6. The power storage device packaging material according to any one of items 1 to 5, which comprises an adhesive layer between the barrier layer and the heat-sealable resin layer.

Item 7. The power storage device packaging material according to item 6, wherein the adhesive layer has a thickness of 5 μm or more.

Item 8. A method for producing a power storage device packaging material comprising the step of obtaining a laminate by laminating at least a base material layer, a barrier layer, and a heat-sealable resin layer in this order from an outer side toward an inner side, wherein
the heat-sealable resin layer contains polypropylene and polyethylene,
with respect to a cross section of the heat-sealable resin layer in a thickness direction parallel to TD, a sea-island structure is observed in a cross-sectional image obtained with a scanning electron microscope,
the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer, and
in the cross-sectional image, relative to the total number of islands in the sea-island structure, the ratio of the total number of islands with an area of 0.02 μm² or less among the islands is 80.0% or more.

Item 9. A power storage device comprising a power storage device element comprising at least a positive electrode, a negative electrode, and an electrolyte, wherein the power storage device element is housed in a package formed of the power storage device packaging material according to any one of items 1 to 7.

REFERENCE SIGNS LIST

1: base material layer
2: adhesive agent layer
3: barrier layer
4: heat-sealable resin layer
5: adhesive layer
6: surface coating layer
10: power storage device packaging material

The invention claimed is:

1. A power storage device packaging material comprising a laminate comprising at least a base material layer, a barrier layer, and a heat-sealable resin layer in this order from an outer side toward an inner side, wherein
the heat-sealable resin layer contains polypropylene and polyethylene,
with respect to a cross section of the heat-sealable resin layer in a thickness direction parallel to a transverse direction (TD), a sea-island structure is observed in a cross-sectional image obtained with a scanning electron microscope,
the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer, and
in the cross-sectional image, relative to the total number of islands in the sea-island structure, the ratio of the total number of islands with an area of 0.02 μm² or less among the islands is 80.0% or more.

2. The power storage device packaging material according to claim 1, wherein in the cross-sectional image of the heat-sealable resin layer, the ratio of the total area of islands in the sea-island structure relative to the area of a measured range in the cross-sectional image is 12.0% or less.

3. The power storage device packaging material according to claim 1, wherein in the cross-sectional image of the heat-sealable resin layer, relative to the total number of islands in the sea-island structure, the ratio of the total number of islands with an area of 0.03 μm² or less among the islands is 90.0% or more.

4. The power storage device packaging material according to claim 1, wherein in the cross-sectional image of the heat-sealable resin layer, relative to the total number of islands in the sea-island structure, the ratio of the total number of islands with an area of 0.01 μm² or less among the islands is 50.0% or more.

5. The power storage device packaging material according to claim 1, wherein in the cross-sectional image of the heat-sealable resin layer, relative to the total number of islands in the sea-island structure, the ratio of the total number of islands with an area of 0.30 μm² or more among the islands is 1.0% or less.

6. The power storage device packaging material according to claim 1, which comprises an adhesive layer between the barrier layer and the heat-sealable resin layer.

7. The power storage device packaging material according to claim 6, wherein the adhesive layer has a thickness of 5 μm or more.

8. A power storage device comprising a power storage device element comprising at least a positive electrode, a negative electrode, and an electrolyte, wherein the power storage device element is housed in a package formed of the power storage device packaging material according to claim 1.

9. The power storage device packaging material according to claim 1, wherein a lubricant is present on the surface of the base material layer, and the amount of the lubricant present is 3 mg/m² or more.

10. The power storage device packaging material according to claim 1, wherein a lubricant is present on the surface of the heat-sealable resin layer, and the amount of the lubricant present is in a range of 10 to 50 mg/m$^2$.

11. The power storage device packaging material according to claim 1, wherein two or more types of lubricants are present on at least one of the surface and the inside of the base material layer.

12. The power storage device packaging material according to claim 1, wherein the thickness of the base material layer is 50 μm or less.

13. The power storage device packaging material according to claim 1, wherein the thickness of the base material layer is 35 μm or less.

14. The power storage device packaging material according to claim 1, wherein the thickness of the base material layer is more than 35 μm and 50 μm or less.

15. The power storage device packaging material according to claim 1, wherein the thickness of the barrier layer is 200 μm or less.

16. The power storage device packaging material according to claim 1, wherein the thickness of the barrier layer is 50 μm or less.

17. The power storage device packaging material according to claim 1, wherein the thickness of the barrier layer is more than 50 μm and 200 μm or less.

18. The power storage device packaging material according to claim 1, wherein in the cross-sectional image, relative to the total number of islands in the sea-island structure, the ratio of the total number of islands with an area of 0.02 μm$^2$ or less among the islands is 95.0% or more.

19. The power storage device packaging material according to claim 1, wherein in the cross-sectional image, relative to the total number of islands in the sea-island structure, the ratio of the total number of islands with an area of 0.01 μm$^2$ or less among the islands is 50.0% or more.

20. The power storage device packaging material according to claim 1, wherein in the cross-sectional image, relative to the total number of islands in the sea-island structure, the ratio of the total number of islands with an area of 0.01 μm$^2$ or less among the islands is 60.0% or more.

21. The power storage device packaging material according to claim 1, wherein in the cross-sectional image of the heat-sealable resin layer, the ratio of the total area of islands in the sea-island structure relative to the area of a measured range in the cross-sectional image is 5.0% or less.

22. The power storage device packaging material according to claim 1, wherein the heat-sealable resin layer is formed of two or more layers with the same resin component or different resin components.

23. The power storage device packaging material according to claim 1, wherein two or more types of lubricants are present on at least one of the surface and the inside of the heat-sealable resin layer.

24. The power storage device packaging material according to claim 1, which comprises an adhesive layer between the barrier layer and the heat-sealable resin layer, and the thickness of the adhesive layer is 30 μm or less.

25. The power storage device packaging material according to claim 1, which comprises an adhesive layer between the barrier layer and the heat-sealable resin layer, and the adhesive layer and the heat-sealable resin layer are formed by co-extrusion lamination.

26. The power storage device packaging material according to claim 25, wherein the heat-sealable resin layer is formed of two or more layers with the same resin component or different resin components.

27. A method for producing a power storage device packaging material comprising the step of obtaining a laminate by laminating at least a base material layer, a barrier layer, and a heat-sealable resin layer in this order from an outer side toward an inner side, wherein
the heat-sealable resin layer contains polypropylene and polyethylene,
with respect to a cross section of the heat-sealable resin layer in a thickness direction parallel to a transverse direction (TD), a sea-island structure is observed in a cross-sectional image obtained with a scanning electron microscope,
the cross-sectional image is such that when the total thickness of a layer positioned closer to the inner side than the barrier layer is taken as 100%, the cross-sectional image is obtained within a range of thicknesses of up to 12.5% from a surface opposite to the barrier layer side of the heat-sealable resin layer, and
in the cross-sectional image, relative to the total number of islands in the sea-island structure, the ratio of the total number of islands with an area of 0.02 μm$^2$ or less among the islands is 80.0% or more.

28. The method for producing the power storage device packaging material according to claim 27, comprising a step of laminating an adhesive layer between the barrier layer and the heat-sealable resin layer.

29. The method for producing the power storage device packaging material according to claim 28, wherein the adhesive layer and the heat-sealable resin layer are formed by co-extrusion lamination.

30. The method for producing the power storage device packaging material according to claim 27, wherein the heat-sealable resin layer is formed of two or more layers with the same resin component or different resin components.

* * * * *